US012583685B2

(12) United States Patent
Freeman et al.

(10) Patent No.: US 12,583,685 B2
(45) Date of Patent: Mar. 24, 2026

(54) OPERATOR PLATFORM UNITS FOR USE WITH CONVEYORS

(71) Applicant: FMH Conveyors LLC, Jonesboro, AR (US)

(72) Inventors: Barry Wayne Freeman, Norfolk, VA (US); Andrew Allen Young, Bono, AR (US); Brian Richard Perkins, Rural Hall, NC (US); Jeffrey Lynn Fielder, Jonesboro, AR (US)

(73) Assignee: FMH Conveyors LLC, Jonesboro, AR (US)

( * ) Notice: Subject to any disclaimer, the term of this patent is extended or adjusted under 35 U.S.C. 154(b) by 102 days.

(21) Appl. No.: 18/608,055

(22) Filed: Mar. 18, 2024

(65) Prior Publication Data

US 2024/0308777 A1       Sep. 19, 2024

Related U.S. Application Data

(60) Provisional application No. 63/452,862, filed on Mar. 17, 2023.

(51) Int. Cl.
B65G 21/14          (2006.01)
B65G 15/26          (2006.01)

(52) U.S. Cl.
CPC ............ B65G 21/14 (2013.01); B65G 15/26 (2013.01)

(58) Field of Classification Search
CPC ................................ B65G 21/14; B65G 15/26

USPC ................................................... 198/313, 812
See application file for complete search history.

(56) References Cited

U.S. PATENT DOCUMENTS

| | | | | |
|---|---|---|---|---|
| 5,256,021 | A | * | 10/1993 | Wolf ...................... B65G 67/08 |
| | | | | 414/676 |
| 5,727,645 | A | * | 3/1998 | Woodling ............. B66F 11/046 |
| | | | | 182/2.11 |
| 2015/0003946 | A1 | * | 1/2015 | Verbeck .................... B66F 9/19 |
| | | | | 414/592 |
| 2022/0008265 | A1 | * | 1/2022 | Hoadley .................. A61G 1/04 |
| 2023/0045842 | A1 | * | 2/2023 | Campbell .............. B65G 21/14 |

FOREIGN PATENT DOCUMENTS

| | | | | | |
|---|---|---|---|---|---|
| EP | | 2952457 | A1 | * 12/2015 | ............. B65G 67/08 |
| GB | | 2537669 | A | * 10/2016 | ............. B65G 67/02 |
| GB | | 2552025 | A | * 1/2018 | ............. B65G 67/08 |

* cited by examiner

*Primary Examiner* — James R Bidwell
(74) *Attorney, Agent, or Firm* — Michael Best & Friedrich LLP

(57)          ABSTRACT

Exemplary operator platform units may include a mounting assembly configured to couple to a conveyor and a drive system assembly coupled to the mounting assembly. The drive system assembly may include a drive assembly and a drive rod configured to be driven by the drive assembly. A platform assembly is movably coupled to the drive system assembly. The platform assembly includes a platform configured to support an operator, and a controller in communication with the drive assembly. The controller is configured to actuate the drive assembly and move the platform relative to the drive system assembly and the conveyor.

15 Claims, 20 Drawing Sheets

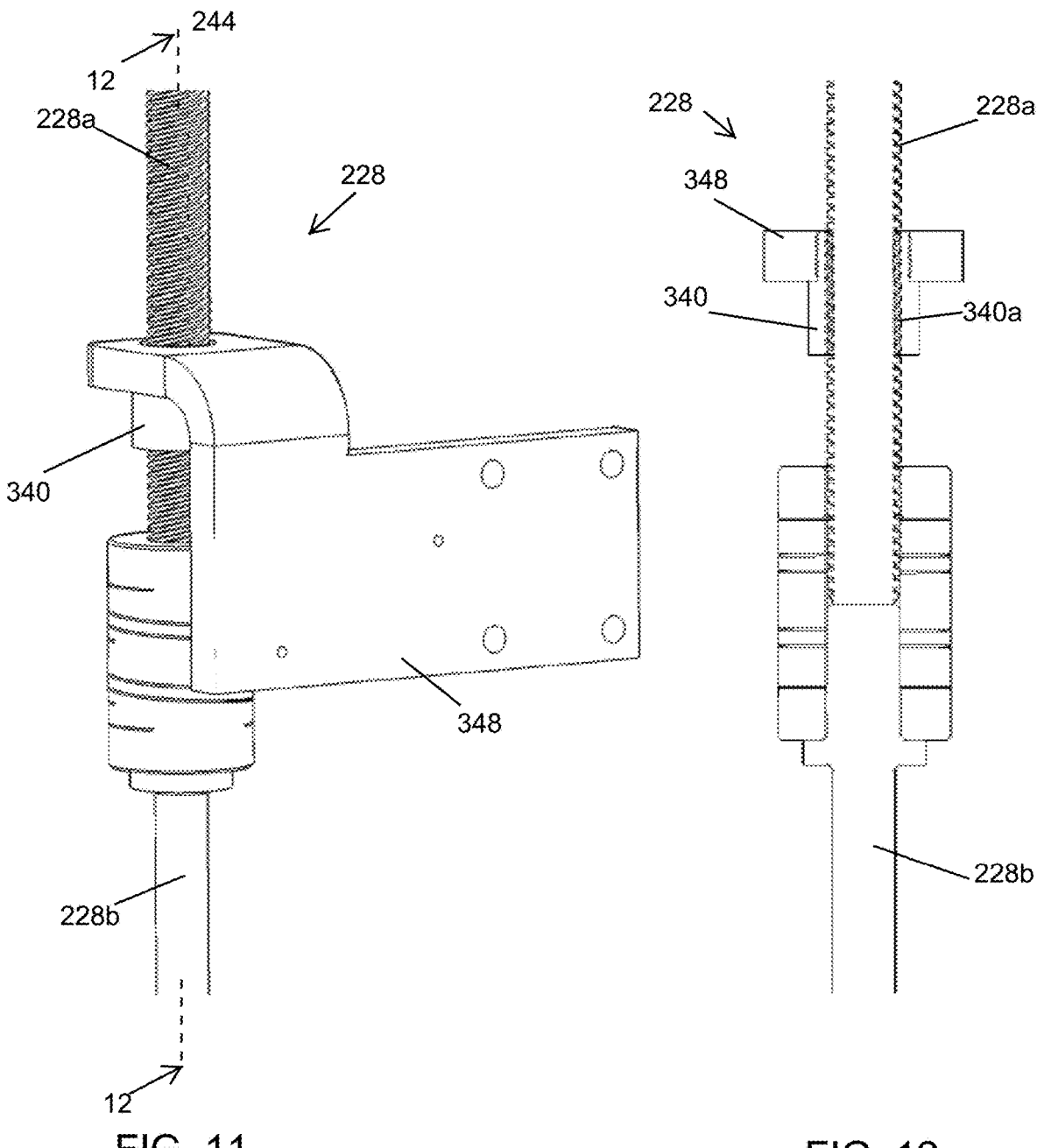
FIG. 11                 FIG. 12

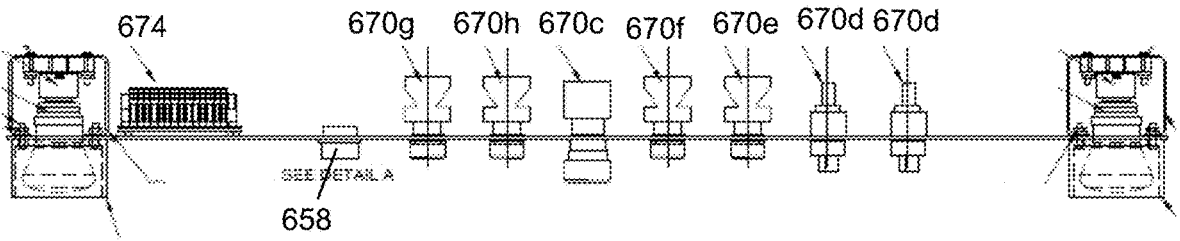
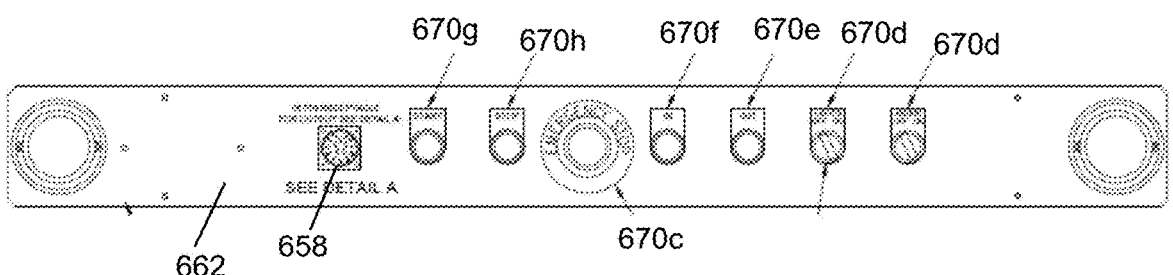
FIG. 14
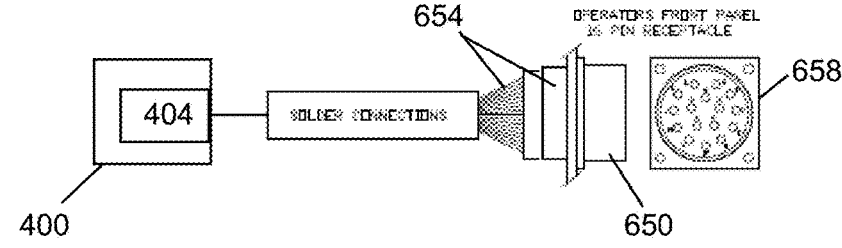
FIG. 15

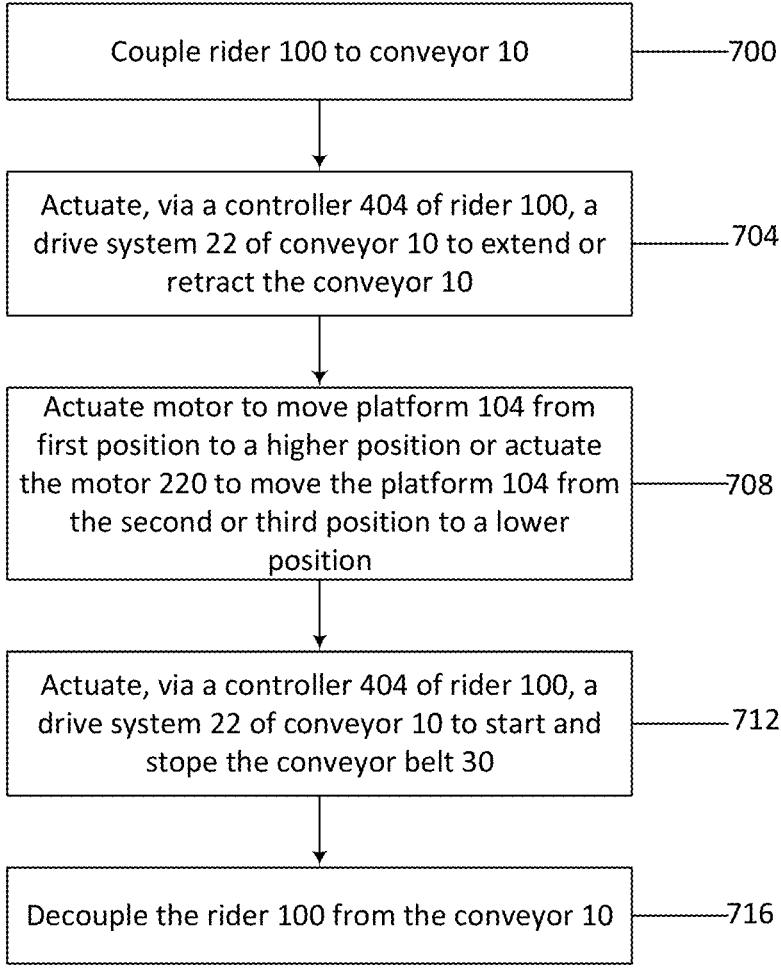

Couple rider 100 to conveyor 10 —————700

Actuate, via a controller 404 of rider 100, a drive system 22 of conveyor 10 to extend or retract the conveyor 10 —————704

Actuate motor to move platform 104 from first position to a higher position or actuate the motor 220 to move the platform 104 from the second or third position to a lower position —————708

Actuate, via a controller 404 of rider 100, a drive system 22 of conveyor 10 to start and stope the conveyor belt 30 —————712

Decouple the rider 100 from the conveyor 10 —————716

FIG. 16

OPERATOR PLATFORM UNITS FOR USE WITH CONVEYORS

CROSS-REFERENCE TO RELATED APPLICATIONS

This application claims priority to co-pending U.S. Provisional Patent Application No. 63/452,862 filed on Mar. 17, 2023, the contents of which is incorporated herein by reference.

INTRODUCTION

Telescopic conveyors may be used to load or unload packages from trailers and containers. A "rider" device may be fixed to an extendable end of the telescope conveyor and support an operator while the operator loads or unloads packages.

SUMMARY

In one embodiment, an operator platform unit couplable to a conveyor is disclosed. The operator platform unit includes a mounting assembly configured to couple to the conveyor and a drive system assembly coupled to the mounting assembly. The drive system assembly includes a drive assembly and a drive rod configured to be driven by the drive assembly. A platform assembly is movably coupled to the drive system assembly. The platform assembly includes a platform configured to support the operator, and a controller in communication with the drive assembly. The controller is configured to actuate the drive assembly and move the platform relative to the drive system assembly and the conveyor.

In another embodiment, a method of using an operator platform unit is disclosed. The operator platform unit includes a mounting assembly that is couplable to a conveyor, a drive system assembly that is coupled to the conveyor, and a platform assembly that is movable coupled to the drive system assembly. The drive system assembly includes a drive assembly configured to be driven by the motor and a drive rod configured to be driven by the drive assembly. The platform assembly includes a platform that supports an operator. The method includes coupling the operator platform unit to the conveyor by coupling the mounting assembly to the conveyor and actuating, via a controller of the operator platform unit, the drive assembly to move the platform relative to the drive system assembly and the conveyor between a first position in which the platform is at a first height and a second position in which the platform is at a second, different height.

Other aspects of the technology will become apparent by consideration of the detailed description and accompanying drawings.

BRIEF DESCRIPTION OF THE DRAWINGS

FIG. 11 illustrates a detailed view of a portion of the operator platform unit of FIG. 1.

FIG. 12 illustrates a detailed cross-sectional view the portion of the operator platform unit of FIG. 11 along the line 12-12 of FIG. 11.

FIG. 14 illustrates a schematic of a control panel of conveyor of FIG. 1.

FIG. 15 illustrates an exemplary electrical connector for coupling the operator platform unit of FIG. 1 to the conveyor of FIG. 1.

FIG. 16 illustrates an exemplary method of use of the operator platform unit of FIG. 1.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, aspects may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software-based devices, as well as a plurality of different structural components may be utilized to implement the technology. For example, "controllers" described in the specification may include one or more electronic processors or processing units, one or more computer-readable medium modules, one or more input/output interfaces, and various connections (for example, a system bus) connecting the components.

DETAILED DESCRIPTION

Generally, instantly disclosed systems and methods are directed to an operator platform unit that is configured to support one or more operators and is removably couplable to a conveyor. Typically, exemplary operator platform units are connected to a telescopic conveyor. Exemplary operator platform units may be configured to ride along a floor of a trailer or container. Exemplary operator platform units may be retrofitted onto telescopic conveyor units. Exemplary operator platform units are movable without a hydraulic drive assembly, in contrast to conventional operator platform units. Avoiding the use of hydraulic drives can simplify maintenance and may improve safety.

Figure 1:
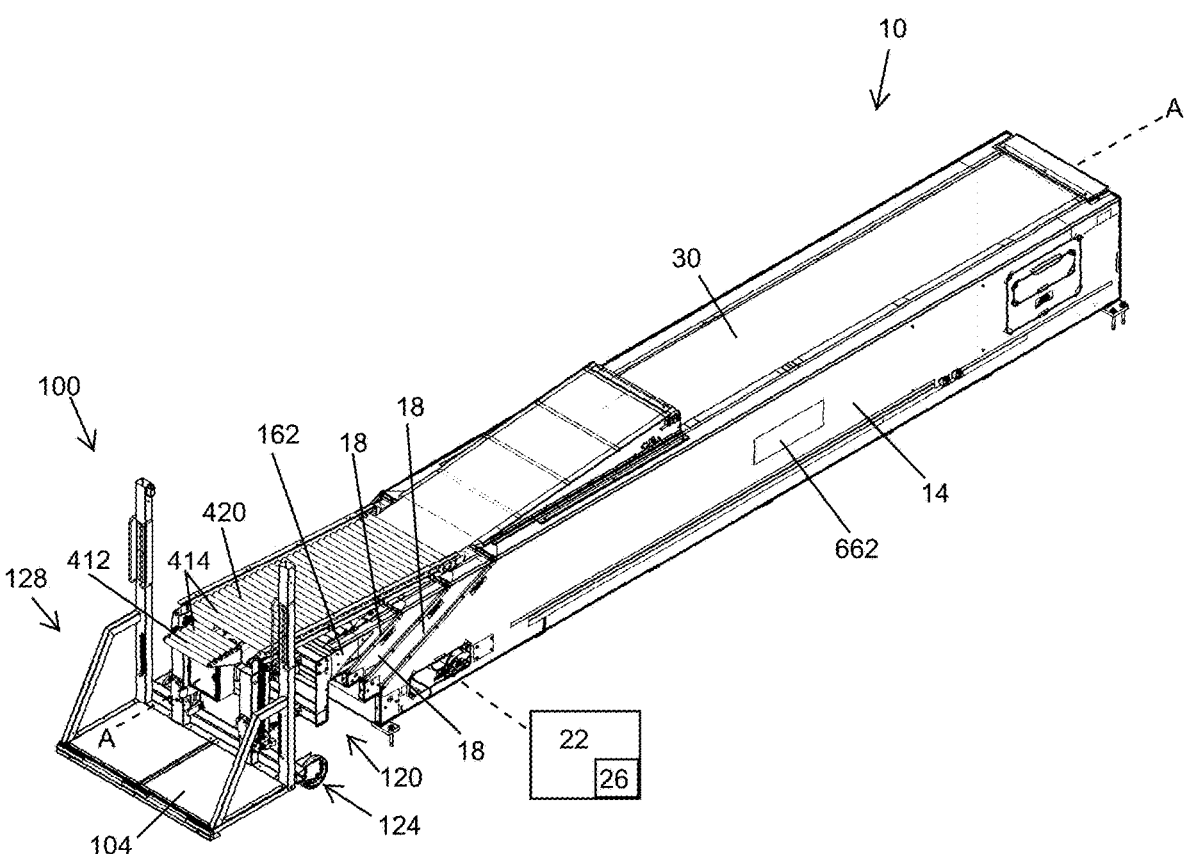
FIG. 1 illustrates a perspective view of an exemplary operator platform unit coupled to a conveyor.

FIG. 1 illustrates a telescopic conveyor 10 and exemplary operator platform unit 100. Telescopic conveyor 10 includes a fixed base section 14 and at least one extensible section 18. Extensible section 18 moves forward and rearward relative to the base section 14 via a drive system 22, which is controlled by a controller 26 of the conveyor 10. A conveyor belt 30 runs a length of a top surface and typically is operable at various speeds via the drive system 22. In the illustrated embodiment, the conveyor belt 30 is positioned along a longitudinal axis A of the conveyor 10. Typically, the telescopic conveyor is configured to traverse into and out of a cargo container, which may be backed into a loading/unloading dock (not shown) at a warehouse distribution center.

The operator platform unit 100 may be electrically and physically connected to the telescopic conveyor 10. The operator platform unit 100 is configured to move with the telescopic conveyor 10 into and out of the cargo container. An operator can operate the conveyor 10 and the operator platform unit 100 from control panels 450 of the operator platform unit 100.

Figure 2:
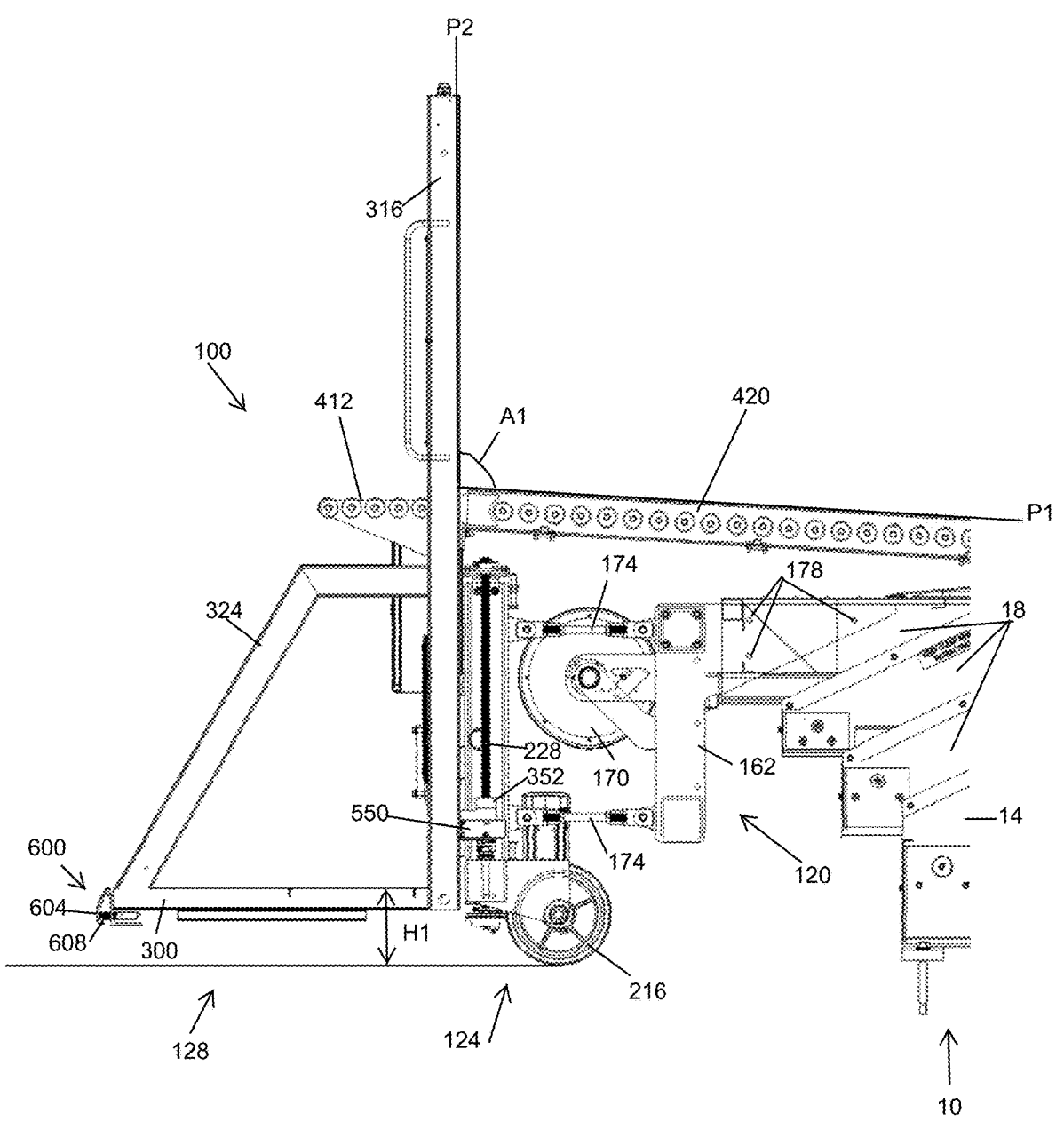
FIG. 2 illustrates a side view of the operator platform unit shown in FIG. 1 with a platform at a first height relative to a support surface and the conveyor.
Figure 3:
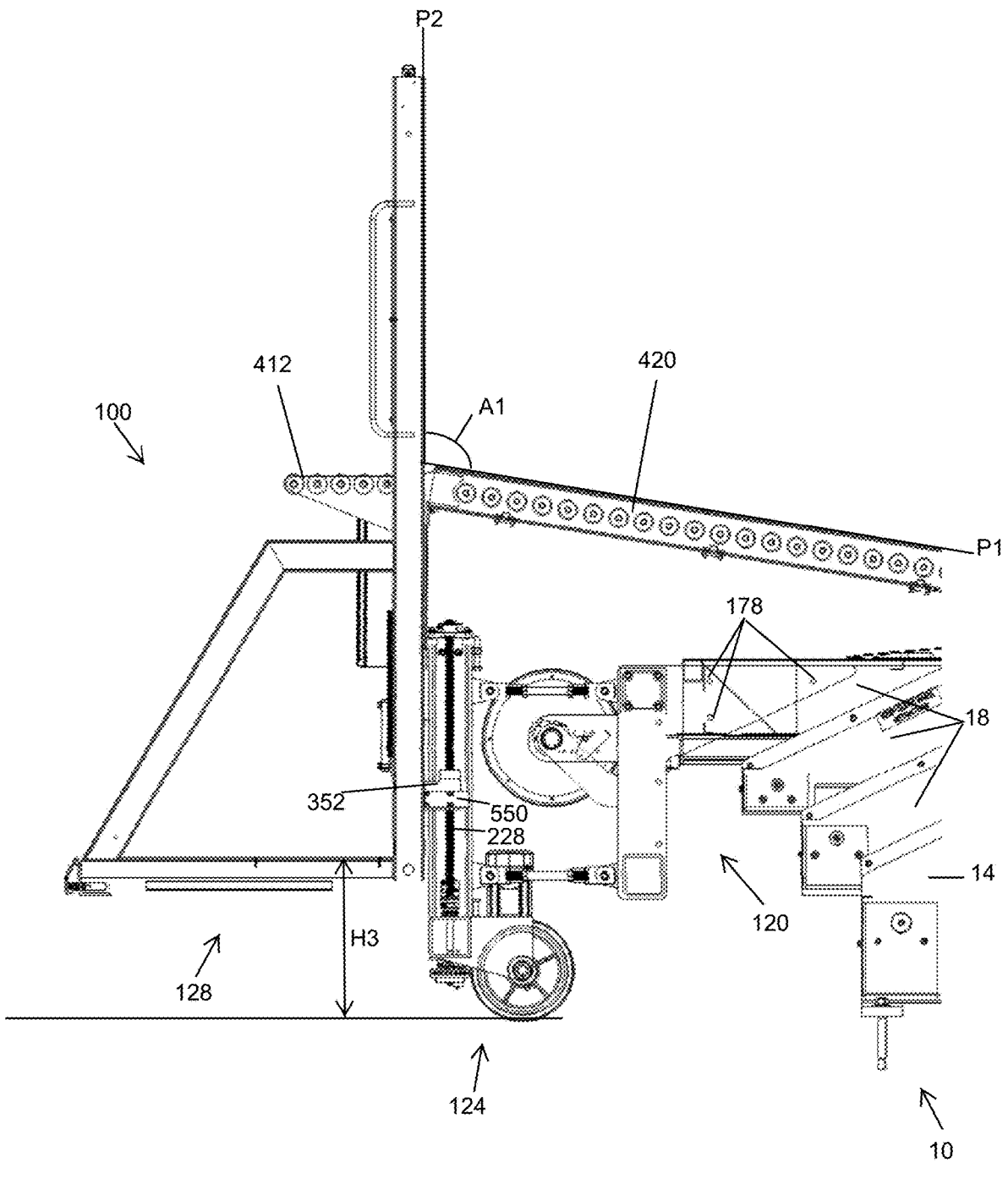
FIG. 3 illustrates a side view of the operator platform unit shown in FIG. 1 with the platform at a second height relative to a support surface and the conveyor.
Figure 4:
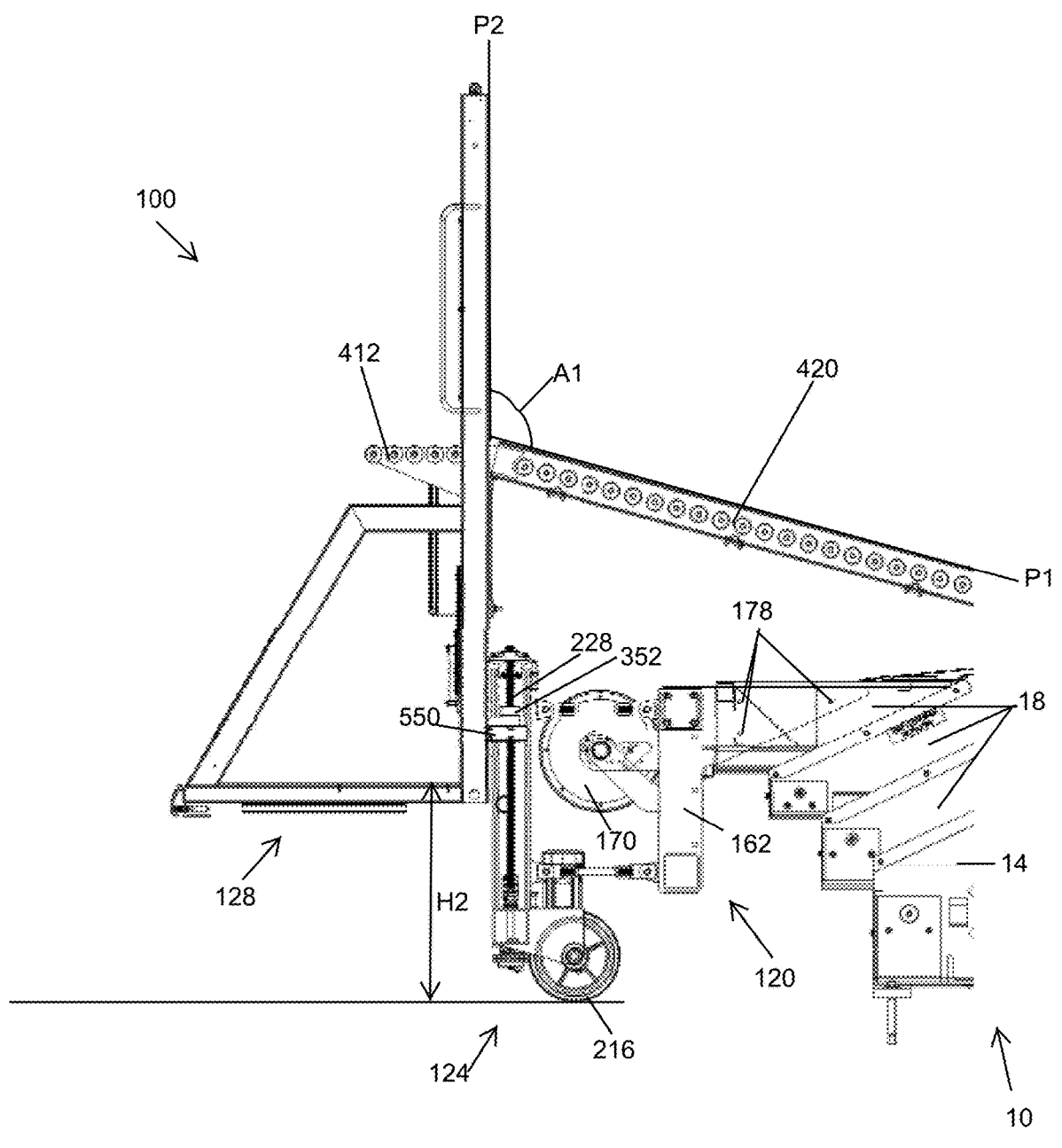
FIG. 4 illustrates a side view of the operator platform unit of FIG. 1 with the platform at a third height relative to a support surface and the conveyor.

The operator platform unit 100 also includes a platform 104 that is movable relative to conveyor 10, as shown in FIGS. 2-4. The platform 104 is vertically movable such that the operator can unload or load the cargo container from top to bottom and front to back while remaining on the platform 104. The operator platform unit 100 therefore improves ergonomics and productivity of operators when unloading/loading a cargo container. The operator platform unit 100 can be electrically and physically disconnected from the telescopic conveyor 10 and mounted to a telescopic conveyor.

FIGS. 2-10 illustrate the operator platform unit 100 in greater detail and are discussed concurrently below, unless otherwise indicated. The operator platform unit 100 includes a mounting assembly 120, a drive system assembly 124 coupled to the mounting assembly 120, and a platform assembly 128 movably coupled to the drive system assembly 124.

Figure 5:
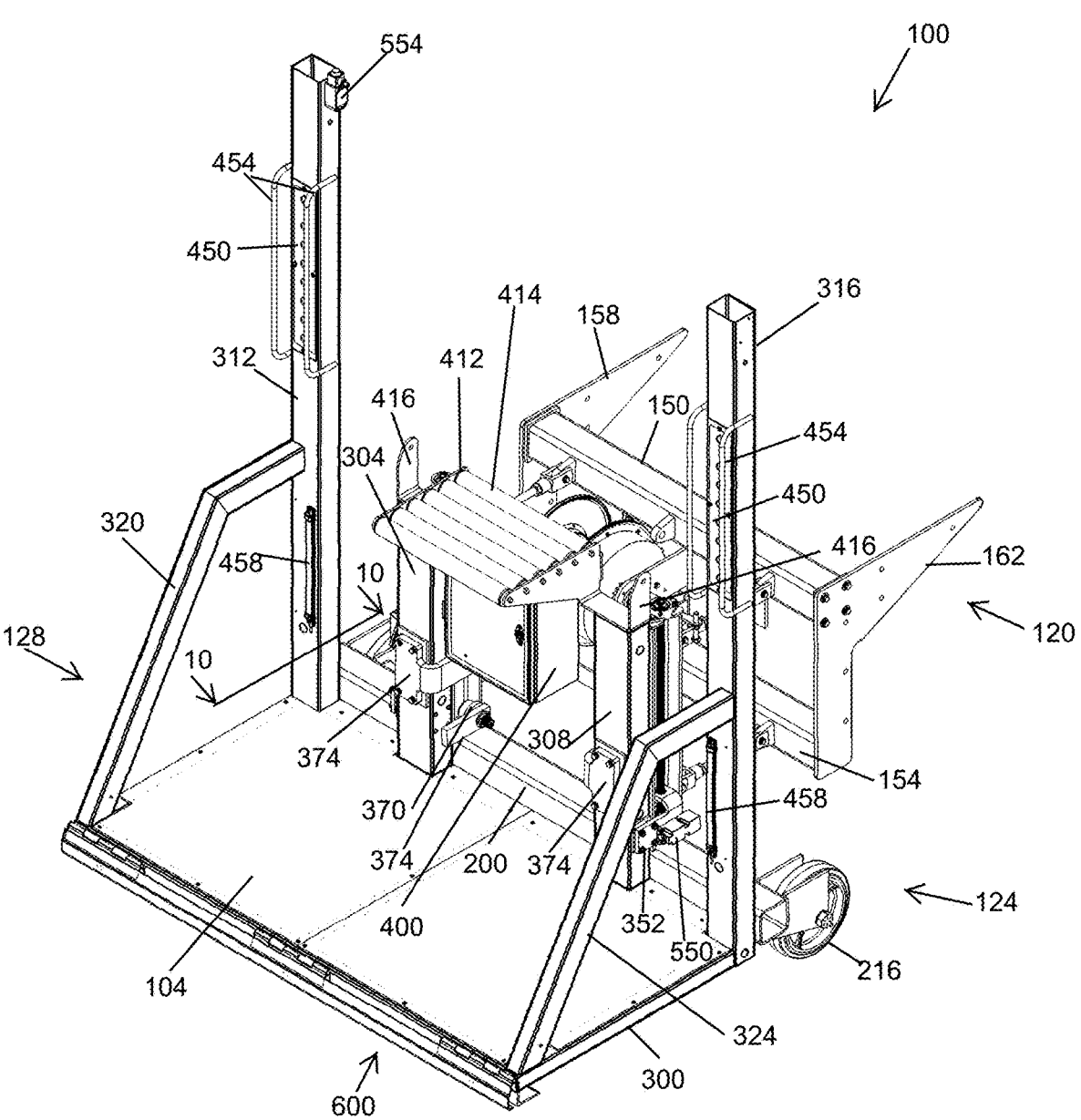
FIG. 5 illustrates a front top perspective view of the operator platform unit of FIG. 1.
Figure 6:
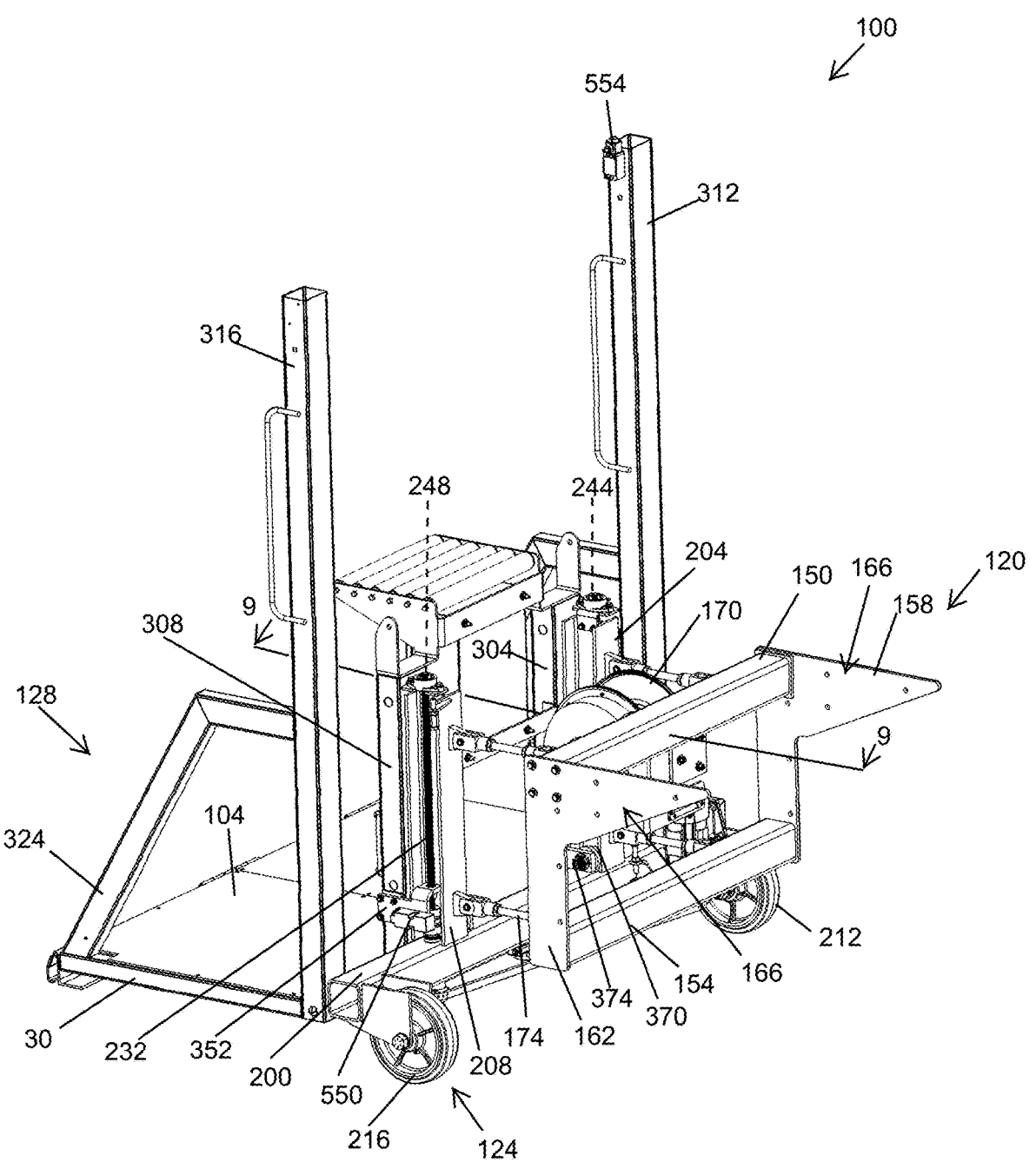
FIG. 6 illustrates a rear top perspective view of the operator platform unit of FIG. 1.
Figure 7:
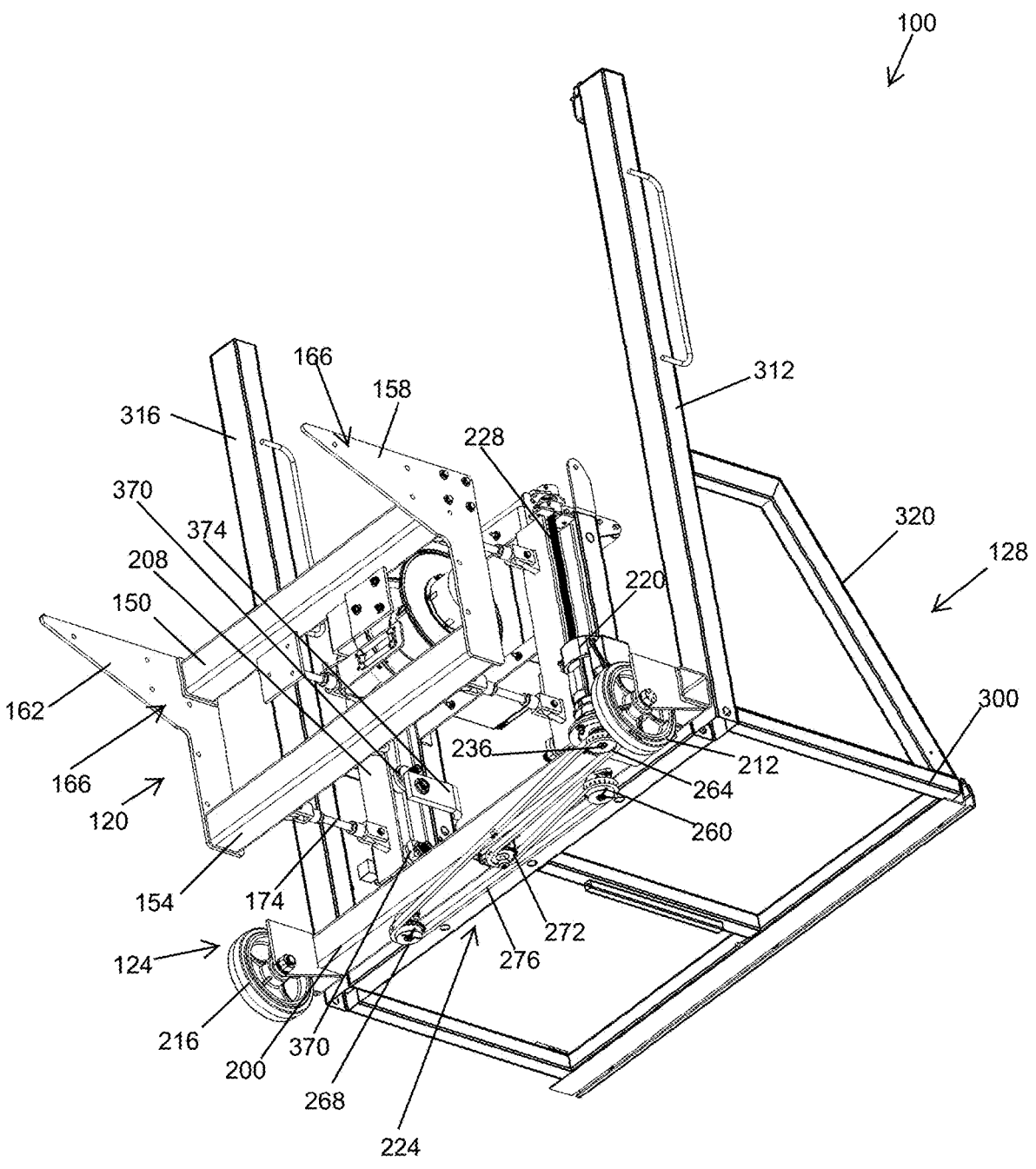
FIG. 7 illustrates a rear bottom perspective view of the operator platform unit of FIG. 1.

With respect to FIGS. 5-7, the mounting assembly 120 physically connects the operator platform unit 100 to the telescopic conveyor 10. The mounting assembly 120 includes a first support member 150, a second support member 154, a first bracket 158, and a second bracket 162. The first bracket 158 is coupled to the first and second support members 150, 154 and the second bracket 162 is coupled to the first and second support members 150, 154. The first and second support members 150, 154 and the first and second brackets 158, 162 constitute a mounting frame. In other embodiments, the mounting frame may have other configurations.

As shown, the first bracket 158 and the second bracket 162 (FIG. 1) are coupled on opposite sides of the conveyor 10. In the illustrated embodiment, the first bracket 158 is configured to be coupled to a first side of the most distal extensible section 18 of the conveyor 10 and the second bracket 162 is configured to be coupled to a second, opposite side of the most distal extensible section 18 of the conveyor 10. Each of the first and second brackets 158, 162 include a plurality of apertures 166. Each of the plurality of apertures 166 is configured to align with a corresponding aperture (not shown) of the conveyor 10 and a fastener 178 (e.g., a bolt, FIGS. 2-4) is received within the aligned apertures 166 to couple the first and second brackets 158, 162 (and therefore the mounting assembly 120) to the conveyor 10. Because the operator platform unit 100 is coupled to the conveyor 10 via fasteners, the fasteners 178 can be removed to remove the operator platform unit 100 from one conveyor 10 and recoupled via the fasteners 178 to another conveyor 10. In other embodiments, the operator platform unit 100 may use coupling mechanisms (e.g., cotter pins, detent mechanisms, etc.) to removably couple the operator platform unit to the conveyor 10.

The drive system assembly 124 couples the platform assembly 128 to the mounting assembly 120. The drive system assembly 124 also supports the operator platform unit on a support surface, such as a ground surface or floor. The drive system assembly 124 includes a frame and a drive assembly supported by the frame. The drive assembly eliminates the need for hydraulic drive assemblies of conventional operator platform units, which require specialty equipment to operate and maintain.

With specific reference to FIG. 6, the frame includes a base member 200, a first support member 204 that extends from the base member 200, and a second support member 208 that extends from the base member 200. The base member 200 includes a first wheel 212 and a second wheel 216 that engage the support surface. In the illustrated embodiment, the wheels are castors, but the wheels may be other types of wheels in other embodiments.

Because the operator platform unit 100 is supported by the first and second wheels 212, 216, the operator platform unit 100 is capable of being movable with conveyor 10. Accordingly, the operator platform unit 100 is supported on the support surface, rather than being cantilevered relative to the other components of the operator platform unit 100 and the conveyor 10. The operator platform unit 100, via the first and second wheels 212, 216, provides a structure that will not sway, in contrast to operator platform units 100 that are fully supported by a telescoping stage of a telescopic conveyor. Additionally, the first and second wheels 212, 216 also enable the operator platform unit 100 to be movable from one conveyor 10 to another conveyor 10.

As shown in FIGS. 2-8, a plurality of linkages 174 movably couple the mounting assembly 120 to the drive system assembly 124. The linkages 174 assist an operator in coupling the operator platform unit 100 to the conveyor 10 by allowing relative movement between mounting assembly 120 and the drive system assembly 124. The linkages 174 are coupled between the mounting frame and the first and second support members 204, 208. As shown, two linkages 174 extend between the mounting frame and the first support member 204 and two linkages 174 extend between the mounting frame and the second support member 208. In other embodiments, there may more or fewer linkages. In the illustrated embodiment, each of the linkages 174 has a first end pivotably coupled to the mounting frame and a second end pivotably coupled to the respective first or second support member 204, 208.

In the illustrated embodiment, as shown in FIG. 1, the linkages 174 are positioned between the mounting assembly 120 and drive system assembly 124 such that a plane generally bisecting the operator platform unit 100 is coincident with the longitudinal axis A of the conveyor 10. In this embodiment, to the extent that the operator platform unit 100 extends beyond the lateral sides of the conveyor 10, the portion of the operator platform unit 100 that extends from the first side of the conveyor 10 measures about the same as the portion of the operator platform unit 100 that extends from the second side of the conveyor 10. Accordingly, as shown in FIG. 1, the operator platform unit 100 is centered relative the conveyor 10.

Figure 18:
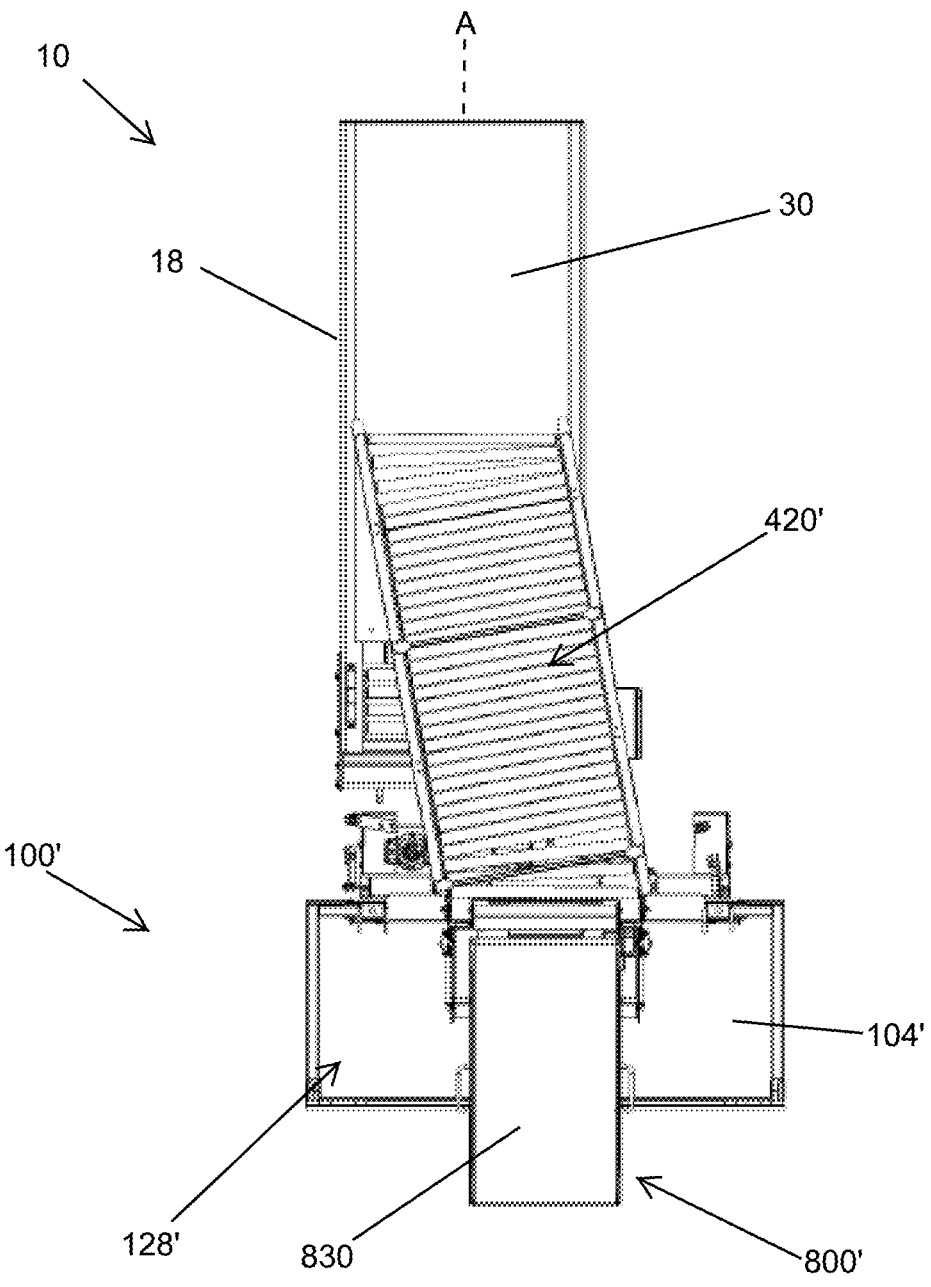
FIG. 18 illustrates a plan view of the platform unit shown in FIG. 17.
Figure 19:
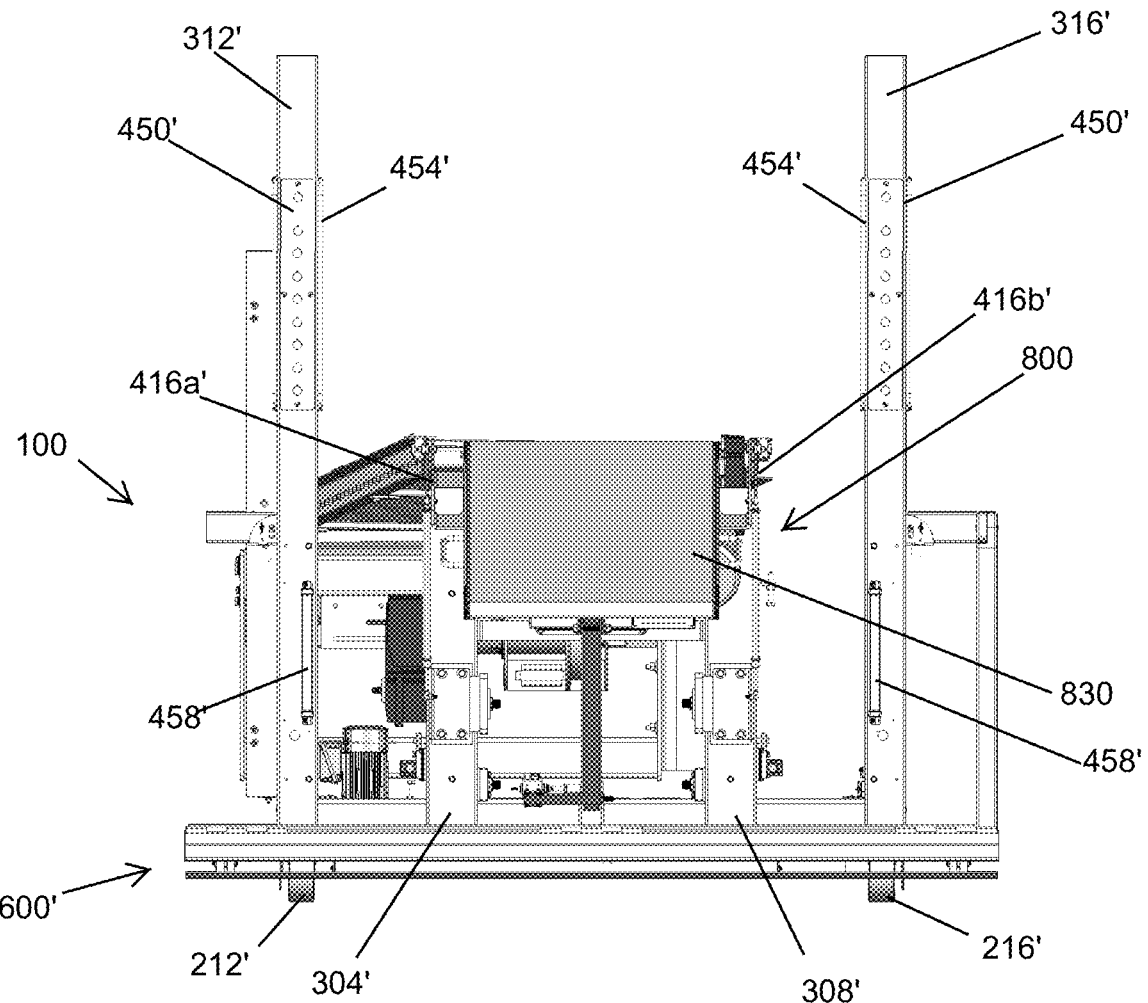
FIG. 19 illustrates a front view of the platform unit shown in FIG. 17.

In other embodiments (such as FIG. 18 discussed in greater detail below), the linkage 174 may be positioned between the mounting assembly 120 and drive system assembly 124 such that the plane generally bisecting the operator platform unit 100 is laterally offset relative to the longitudinal axis A of the conveyor 10. In this embodiment, if the plane is laterally offset from the longitudinal axis towards the first side of the conveyor, to the extent that the operator platform unit 100 extends beyond the lateral sides of the conveyor 10, the portion of the operator platform unit 100 that extends from the first side of the conveyor 10 is greater than the portion of the operator platform unit 100 that extends from the second side of the conveyor 10 (or vice versa). Accordingly, the operator platform unit 100 may be laterally offset relative to the conveyor 10.

Figure 8:
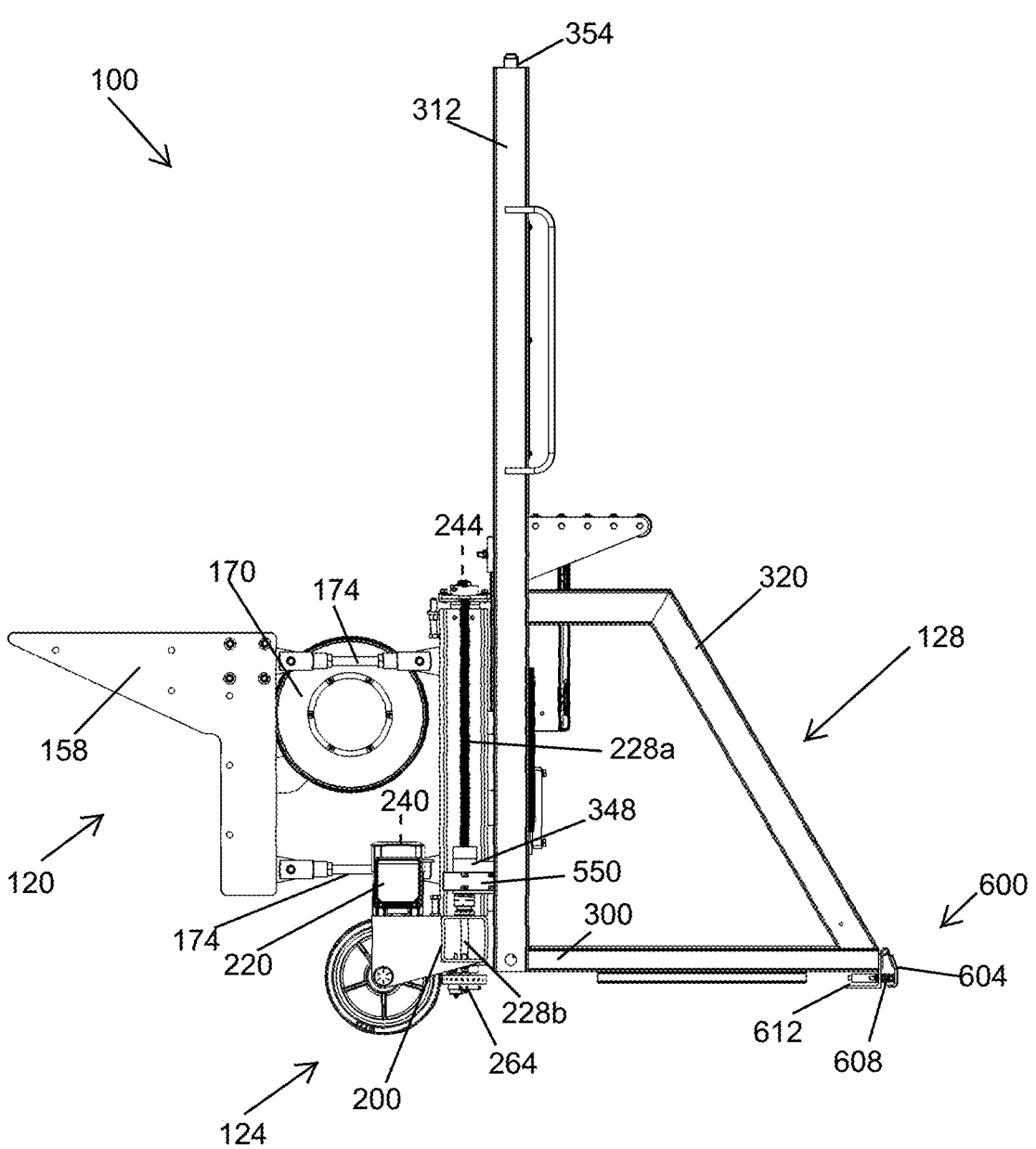
FIG. 8 illustrates a side view of the operator platform unit of FIG. 1.

With respect to FIG. 7, the drive assembly includes a motor 220, a transmission 224 operably coupled to the motor 220, a first drive rod 228 operably coupled to the transmission 224, and a second drive rod 232 (FIG. 6) operably coupled to the transmission 224. The transmission 224 converts actuation of the motor 220 into actuation of the first and second drive rods 228, 232 such that the drive rods 228, 232 are actuated at the same rate. The motor 220 includes a drive shaft 236 that extends along a first drive axis 240 (FIG. 8). In the illustrated embodiment, the transmission 24 causes rotation of the drive shaft 236 of the motor 220 about the first drive axis 240.

The first drive rod 228 (FIG. 5) is supported by the base member 200 and is adjacent and parallel to the first support member 204. The second drive rod 232 (FIG. 6) is supported by the base member 200 and is adjacent and parallel to the second support member 208. The first and second drive rods 228, 232 extend along second and third drive axes 244, 248 (FIGS. 6, 8) that are parallel to one another and to the first drive axis 244. A portion of the first drive rod 228 is shown in greater detail in FIGS. 11 and 12. The second drive rod 232 has the same features as the first drive rod 228. Each of the first and second drive rods 228, 232 are threaded drive rods and therefore include a threaded portion 228a, 232a and a drive shaft 228b, 232b extending from the threaded portion 228a, 232a. The threaded portion 228a, 232a is aligned with the drive shaft 228b, 232b portion along the respective axis 244, 248.

Referring to FIG. 7, the transmission 224 is a chain and sprocket transmission in the illustrated embodiment, but in other embodiments, the transmission may have other configurations. The transmission 224 includes a first drive sprocket wheel 260 that is operably coupled to the drive shaft 236 of the motor 220, a first driven sprocket wheel 264 operably coupled to the drive shaft portion 228b of the first drive rod 228, and a second driven sprocket wheel 268 operably coupled to the drive shaft portion 232b of the second drive rod 232. In the illustrated embodiment, the transmission 224 includes a third driven sprocket wheel 272 that is positioned between the drive sprocket wheel 260 and the first driven sprocket wheel 264 and the drive sprocket wheel 260 and the second driven sprocket wheel 264. In other embodiments, the third driven sprocket 272 wheel may be omitted or there may be additional driven sprocket wheels. A chain 276 is operably coupled between the drive sprocket wheel 260, the first driven sprocket wheel 264, the second driven sprocket wheel 268, and, in this case, the third driven sprocket wheel 272.

Actuation of the motor 220 is configured to actuate the drive sprocket wheel 260. That is, when the motor 220 is actuated, the drive shaft 236 rotates about the first drive axis 244 such that the driven sprocket wheel 260 to also rotates about the first drive axis 244. Actuation of the drive sprocket wheel 260 is configured to move the chain 276 to simultaneously actuate the first driven sprocket wheel 264 and the second driven sprocket wheel 268 and thereby simultaneously actuate the first drive rod 228 and the second drive rod 232. That is, actuation of the drive sprocket wheel 260 is configured to move the chain 276 to simultaneously rotate the first driven sprocket wheel 264, and therefore the first drive rod 228, about the second drive axis 244, and the second driven sprocket wheel 268, and therefore the second drive rod 232, about the third drive axis 248.

With respect to FIGS. 5-7, the platform assembly 128 is movably coupled to the drive system assembly 124 such that the platform 104 may be positioned a variety of heights relative to the support surface. As shown in FIGS. 2-4, the platform assembly 128 is configured move relative to the drive system assembly 124 and, accordingly, relative to the conveyor 10. More specifically, the platform assembly 128 is configured to move vertically relative to the drive system assembly 124 and relative to the conveyor 10. The platform assembly 128 includes a platform assembly frame and the platform 104 supported by the platform assembly frame. The platform assembly frame includes a base member 300 and a plurality of support members 304, 308, 312, 316, 320, 324 coupled to and extending from the base member 300.

A first support member 304 and a second support member 308 are positioned between a first end and a second opposite end of the base member 300. The first and second support members 304, 308 have a first height.

A third support member 312 is coupled at or adjacent to the first end of the base member 300 and a second support member 316 is coupled at or adjacent to the second end of the base member 300. The third and fourth support members 312, 316 have a second height that is greater than the first height. The second height is configured to be taller than a height of the operator(s). Accordingly, the second height is greater than about 75 inches. In the illustrated embodiment, the second height is at least 78 inches, for example.

A fifth support member 320 extends between the base member 300 and the third support member 312 and a sixth support member 324 extends between the base member 300 and the fourth support member 316. In the illustrated embodiment, the platform 104 has a width that is sufficient to accommodate two operators. In the illustrated embodiment, the width of the platform 104 is about 58 inches (where "about" means plus or minus standard manufacturing tolerances). In other embodiments, the width of the platform 104 is at least about 55 inches. In other embodiments, the width of the platform 104 is between about 55 inches and about 65 inches. Also, in other embodiments, the platform 104 may be sized to accommodate a single operator (e.g., the platform 104 may measure about 25 inches to about 35 inches).

First and second bushings 340 are supported by the platform assembly frame and operably engage the first and second drive rods 228, 232, respectively. The first bushing 340 is shown in detail in FIGS. 11-12 and represents the structure of both bushings 340. In the illustrated embodiment, a first bracket 348 (FIGS. 6, 11, and 12) is coupled to and extends from the first support member 304 and includes the first bushing 340. A second bracket 352 (FIG. 6) is coupled to and extends from the second support member 308 and includes the second bushing 340. The first bushing 340 is engaged with the first drive rod 228 and the second bushing 340 is engaged with the second guide rod 232. Each of the first and second bushings 340 have a bore 340a extending therethrough that is threaded and matingly receives the threaded portion 228a, 232a of the respective drive rods 228, 232. That is, as discussed in greater detail below, simultaneous rotation of the drive rods 228, 232 causes movement (e.g., vertical movement) of the threaded bushings 340 relative to move the platform assembly 128 relative to the drive system assembly 124.

Additionally, as shown in FIGS. 5-7 and FIG. 9, rollers 370 (e.g., guide rollers) are supported by the platform assembly frame and operably engage the first and second support members 204, 208 of the drive system assembly 120. The rollers 370 provide support to the platform assembly 128 in the horizontal direction, but apply only a minimal amount of friction as the platform assembly 128 moves vertically. In the illustrated embodiment, two brackets 374 are coupled to and extend from each of the first and second support members 304, 308 of the platform assembly 128. Each of the brackets 374 include a roller 370 that is received within a recess 390 of the respective first and second support members 204, 208 of the drive system assembly 120. The rollers 370 are positioned on an opposite side of the support members 204, 208 from the drive rods 228, 232.

Figure 9:
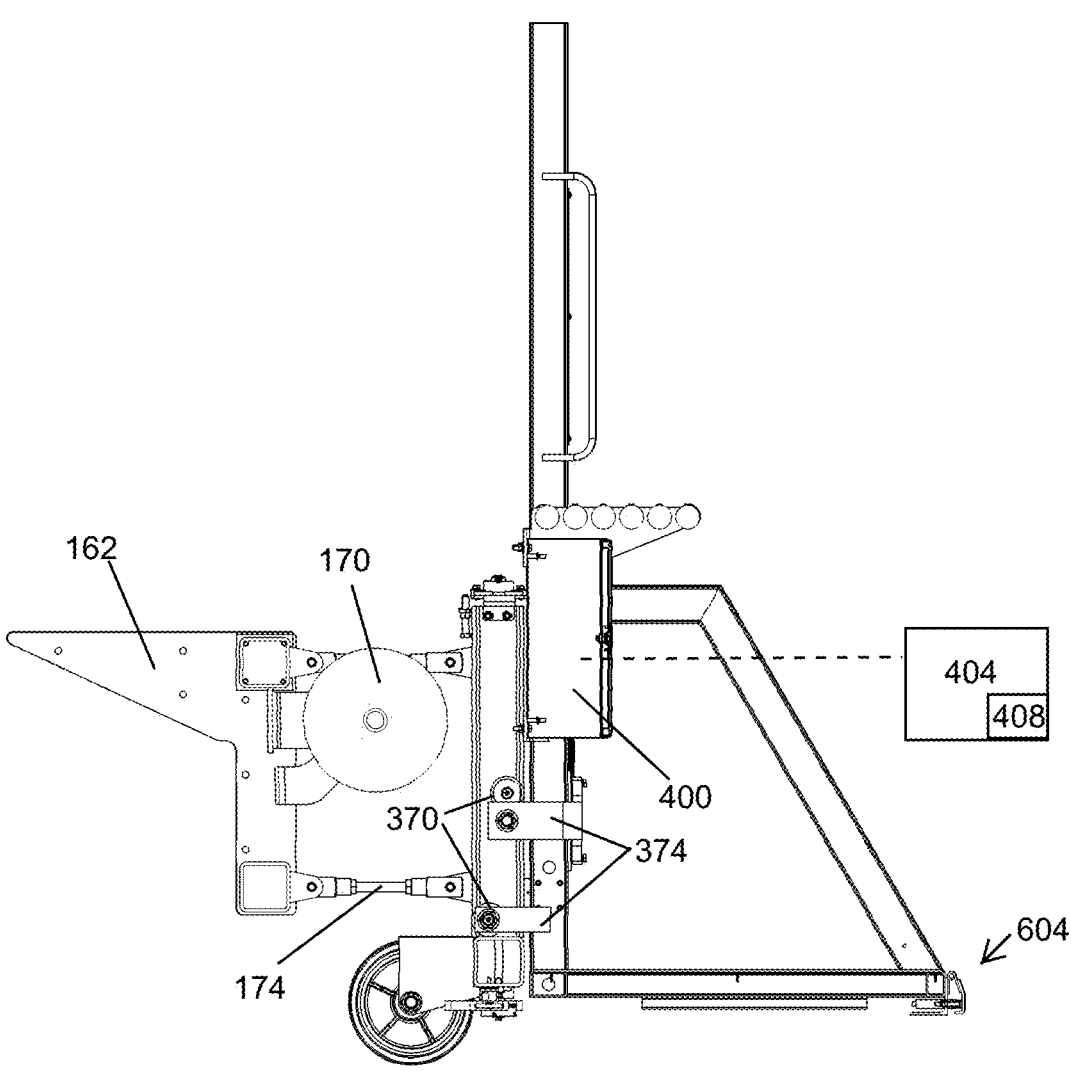
FIG. 9 illustrates a cross-sectional view of the operator platform unit of FIG. 1 along the line 9-9 of FIG. 6.
Figure 10:
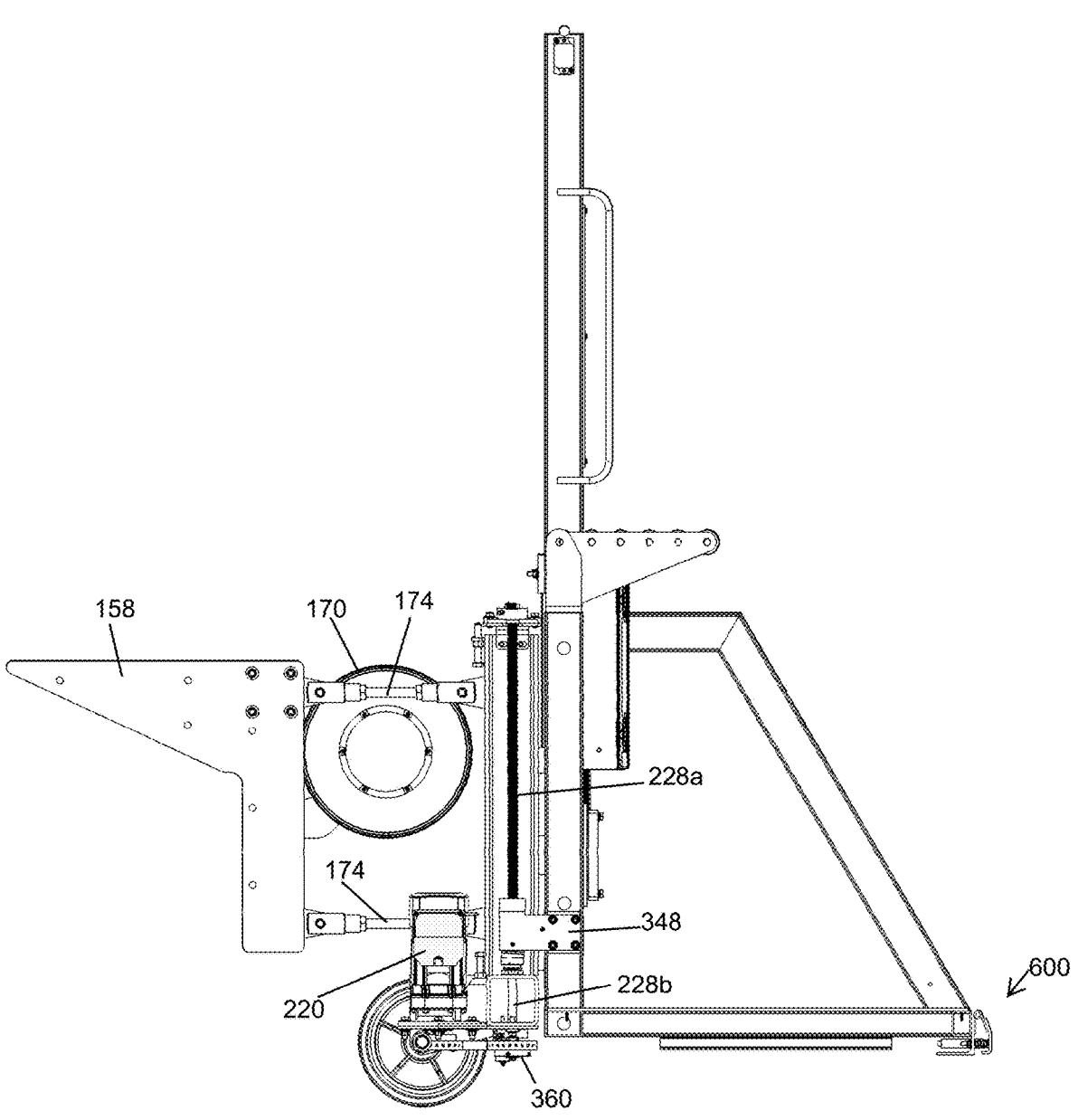
FIG. 10 illustrates a cross-sectional view of the operator platform unit of FIG. 1 along the line 10-10 of FIG. 5.

As shown in FIG. 5 and FIG. 9, the control enclosure 400 is supported by the platform assembly frame (e.g., one or both of the first and second support members 304, 308). The control enclosure 400 encloses a controller 404 (FIG. 9) and related circuitry. The controller 404 is in communication with the motor 220.

In the illustrated embodiment, the controller 404 includes a variable frequency drive 408 (FIG. 9) that enables the motor 220 to be operated at different speeds.

As shown in FIGS. 1 and 5, the platform assembly 128 includes a plurality of gravity rollers 414 that transfer products to and from the platform assembly 128 from the conveyor belt 30. In the illustrated embodiment, a first gravity roller section 412 is supported by the first and second support members 304, 308 of the platform assembly 128. In the illustrated embodiment, each of the first and second support members 304, 308 include an extension 416 that is configured to couple to a second gravity roller section 420 that extends from the platform assembly 128 (e.g., the gravity roller section 412) to the conveyor belt 30 (FIG. 1). The second gravity roller section 420 defines a plane P1 that is positioned at an angle A1 relative to a vertical plane P2 of the platform assembly 128. As shown in FIGS. 2-4, the second gravity roller section 420 is movable relative to the first and second support members 304, 308, such that the angle A1 adjusts as the platform assembly is moved vertically. In other embodiments, the gravity rollers 414 may be replaced powered conveyors. Specifically, one or both gravity roller sections 412, 416 may be replaced by one or more section of powered conveyors. The one or more powered conveyor sections may include powered conveyor belts or powered rollers.

As shown in FIG. 5, each of the third and fourth support members 312, 316 include a control panel 450, a pair of handles 454, and a light source 458. The control panels 450 are each in electrical communication with the controller 404. In the illustrated embodiment, there is a control panel 450 on each side of the platform assembly 128 such that each of the two operators is capable of controlling the platform assembly 128 (and the conveyor 10, as will be discussed below). The control panels are shown in greater detail in FIG. 13. In other embodiments, the platform assembly 128 may include a single control panel.

Figure 13:
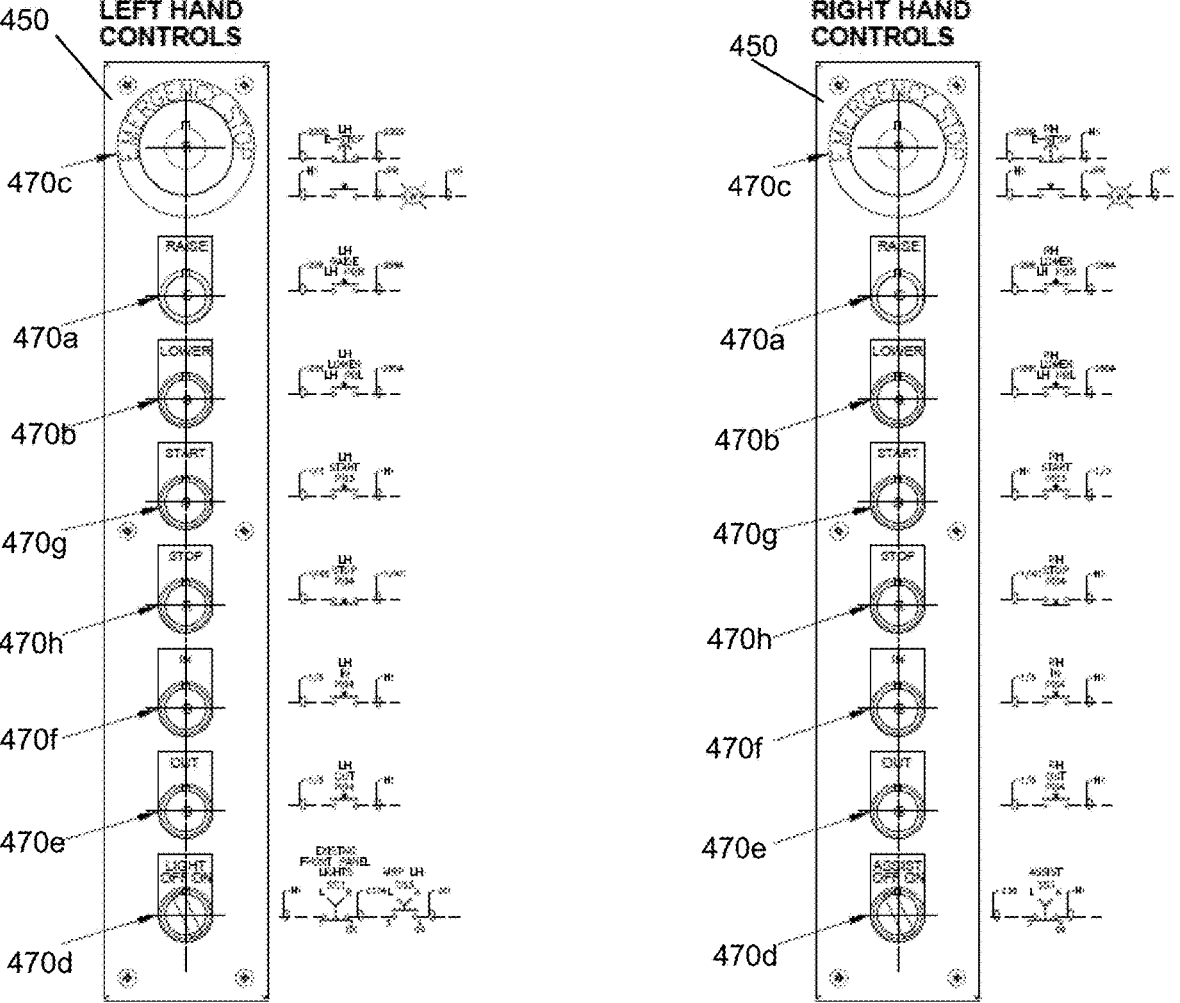
FIG. 13 illustrates a schematic of a control panel of the operator platform unit of FIG. 1.
Figure 17:
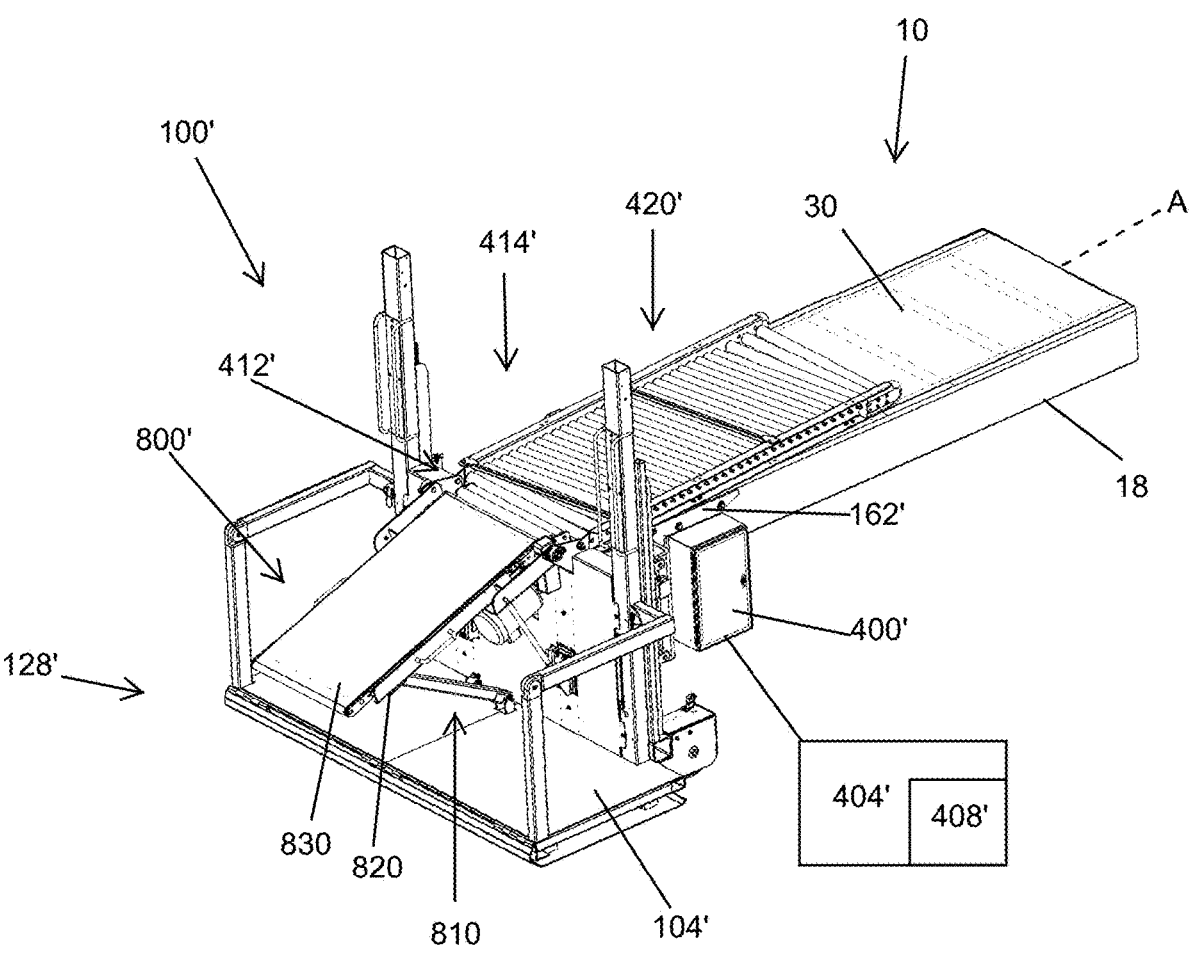
FIG. 17 illustrates a perspective view of another exemplary operator platform unit coupled to a conveyor.

The control panels 450 each include a plurality of actuators 470a (e.g., buttons). In the illustrated embodiment, one of the actuators 470 is an "up" actuator configured to actuate the motor 220 (e.g., the drive shaft 236 thereof) in a first direction and one of the actuators 470b is a "down" actuator configured to actuate the motor 220 (e.g., the drive shaft 236 thereof) in a second, opposite direction. Additionally, as shown in FIG. 13, one of the actuators 470c may be an emergency stop actuator that stops all movement (e.g., of the motor 220 and the drive system 22 of the conveyor 10). Actuating the up/down actuators 470a, 470b starts the motor 220 and releasing the up/down actuators 470, 470b stops the motor 220. The pair of handles 454 extend from the respective support member 312, 316 and are positioned on opposite sides of the control panel 450. The handles 454 assist the operator but are also configured to protect control panel 450 and prevent the actuators 470 from being erroneously actuated.

The light source 458 is in communication with the controller 404 and configured to illuminate in a direction forward of the operator platform unit 100. Accordingly, one of the actuators 470d of the control panel 450 may be a "light on/off" actuator 470d that turns the light source 458 on or off. In some embodiments, one or more fans may be coupled to the platform assembly 128 and in communication with the controller 404. The one or more fans may be used to assist provide cooling air to the operators. The control panel 450 may also include a fan start/stop actuator when a fan is present.

With respect to FIGS. 5-8, the platform assembly 128 includes one or more sensors 550, 554 that prevent the platform assembly 128 from moving below a predetermined minimum threshold or above a predetermined maximum threshold. The sensors 550, 554 are configured to communicate with the controller 404. In the illustrated embodiment, the platform assembly 128 includes a first sensor 550 coupled to the first bracket 348 and a second sensor 550 coupled to the second bracket 352. In the illustrated embodiment, the sensors 550 are proximity sensors that determine when the platform assembly 128 is at, or adjacent to, the predetermined minimum height (FIG. 2), or when the platform assembly 128 is at, or adjacent to, the predetermined maximum height (FIG. 4). When the platform assembly 128 reaches one of these positions, the sensors 550 sense the position of the platform assembly 128 and send a signal to the controller 404 to stop the motor 220. The sensors 550 can be adjusted to operate at customized predetermined minimum and maximum thresholds.

The platform assembly 128 further includes a sensor 554 that prevents the third and fourths support members 312, 316 from contacting another structure (e.g., a top surface or roof) of a cargo container. In the illustrated embodiment, the sensor 554 is a lift sensor (e.g., a loop sensor) that is coupled to the third support member 312. In other embodiments, the sensor 554 may be coupled to the fourth support member 316 or there may be sensors 554 coupled to both the third and fourth support members 312, 316. When the third support member 312 contacts or is adjacent to another structure (e.g., about to contact), the sensor 554 senses the other structure and sends a signal to the controller 404 to stop the motor 220.

As shown in FIG. 8, in the illustrated embodiment, the platform assembly 128 further includes a bumper assembly 600 that is configured to prevent the operator platform unit 100 to be continuing to be advanced into another structure. The bumper assembly 600 is movably coupled to the platform assembly frame. The bumper assembly 600 includes a bumper 604 that is pivotably coupled to the platform assembly frame and a biasing mechanism 608 (e.g., a spring or other equivalent structure). The spring 608 biases the bumper 604 into a first, extended position. The bumper 604 can be moved from the first position to a second position, in which the bumper 604 is closer to the platform assembly frame than in the first position, against the bias of the spring 608. The bumper assembly 600 further includes a sensor 612 that senses when the bumper 604 has moved from the first position, which will be discussed in greater detail below relative to FIG. 16.

In the illustrated embodiment, the operator platform unit 100 is configured to be electrically coupled to the conveyor 10, as well as physically coupled to the conveyor 10 such that an operator can operate the conveyor 10 from the operator platform unit 100. An electrical connector 650 (FIGS. 14 and 15) enables electrical communication between the controller 404 of the operator platform unit 100 and the controller 26 of the conveyor 10. In some embodiments, a cable 654 (which may include one or more wires) is in communication with the controller 404 and extends from a control enclosure 400. The cable 654 includes the electrical connector 650 at its distal end and the electrical connector 650 is configured to be matingly coupled to an electrical connector 658 of the control panel 662 of the conveyor 10. The cable 654 may be supported by a cable reel 170 supported by the mounting frame of the mounting assembly 120.

The control panel 662 has actuators 670c, 670d, 670c, 670f, 670g, 670h that control the conveyor 10. Specifically, the actuators 670e, 670f, 670g, 670h may include, for example, an "out" actuator 670e that extends the conveyor 10 forward, an "in" actuator 670f that extends the conveyor 10 rearward, a "start belt" actuator 670g that starts the conveyor belt 30, and a "stop belt" actuator 670h that stops the conveyor belt 30. In some embodiments, the control panel 662 of the conveyor 10 may be retrofit to be usable with the control panels of existing conveyors. Accordingly, the control panel 662 may include an electrical connector 674 configured to electrically connect the control panel 662 to the drive system 22 of an existing the conveyor 10.

In the illustrated embodiment, the control panels 450 of operator platform unit 100 may include actuators 470e, 470f, 470g, 470h that enable operation of the conveyor 10. The actuators 470e, 470f, 470g, 470h are in communication with the controller 404 of the operator platform unit 100, which sends signals to the controller 26 of the conveyor 10 to operate the conveyor 10. The operator can operate the conveyor 10 using similar actuators 470c, 470d, 470c, 470f, 470g, 470h on the control panel 450 of the operator platform unit 100 that are used on the control panel of the conveyor 10. Specifically, the actuators 470e, 470f, 470g, 470h may include, for example, an "out" actuator 470e that extends the conveyor 10 forward, an "in" actuator 470f that extends the conveyor 10 rearward, a "start belt" actuator 470g that starts the conveyor belt 30, and a "stop belt" actuator 470h that stops the conveyor belt 30.

As noted above, the platform assembly 128 is movably coupled to the drive system assembly 124 such that the platform 104 may be positioned a variety of heights relative to the support surface. The platform assembly 128 is configured to be moved between a first vertical position (FIG. 2) and a second vertical position (FIG. 4). Additionally, the platform assembly 128 is configured to be moved to a third vertical position FIG. 3), which is an intermediate vertical position between the first vertical position and the second vertical position. The third vertical position is merely exemplary as there may be any number of intermediate vertical positions between the first and second vertical positions.

In the first vertical position, the platform 104 is positioned at a first height H1 relative to the support surface. In the second vertical position, the platform 104 is positioned at a second height H2 relative to the support surface. The second height H2 is greater than the first height H1. The first height H1 is also the predetermined minimum height, and the second height is also the predetermined maximum height. In the third vertical position, the platform 104 is positioned at a third height H3 relative to the support surface, and the third height H3 is greater than the first height H1 but less than the second height H2.

FIG. 16 shows operations of an exemplary method of using an operator platform unit. The exemplary operator platform unit 100 may be used to implement the method shown in FIG. 16. The exemplary method begins when the operator platform unit 100 is coupled to the conveyor (operation 700). Once coupled, an operator may actuate the drive system 22 of the conveyor 22, via the control panel 450, to extend and retract the extensible section 18 thereof (operation 704).

For example, the user may actuate the out actuator 470e to extend the conveyor 10. That is, actuation of the out actuator 470e actuates, via the controller 404, the drive system 22 to move the extensible portions 18 of the conveyor 10 forwardly from the base section 14. Because the operator platform unit 100 is physically coupled to the conveyor 10 and includes wheels 212, 216, the operator platform unit 100 is also moved forwardly with the extensible portions 18 of the conveyor 10.

Similarly, the user may actuate the in actuator 470f to retract the conveyor 10. That is, actuation of the in actuator 470f actuates, via the controller 404, the drive system 22 to move the extensible portions 18 of the conveyor 10 rearwardly towards the base section 14. Because the operator platform unit 100 is physically coupled to the conveyor 10 and includes wheels 212, 216 the operator platform unit 100, too, is moved rearwardly with the extensible portions 18 of the conveyor 10. Accordingly, the operator platform unit 100 can be driven in and out of a cargo container by the drive system 22 (e.g., including the controller 26) of the conveyor 10, which eliminates the need for a separate conveyor drive system for the operator platform unit 100.

Moreover, when the conveyor 10 is moving forward and the bumper 604 encounters another structure, the bumper 604 moves from the first position to or towards the second position, the sensor 612 of the bumper assembly 600 sends a first signal to the controller 404 of the operator platform unit 100, which in turn sends a second signal to the controller 30 of the conveyor 10 (via the controller 404 of the operator platform unit 100) to instruct the conveyor 100 to either stop or move rearwards. This prevents the operator platform unit 100 from being driven into another structure, which may cause damage.

Additionally, when the operator has positioned the platform 104 relative to the location of loading or unloading, the operator may actuate the drive assembly of the operator platform unit 100 via the control panel 450 (operation 708). Actuating the drive assembly moves the platform assembly 128 vertically relative to the conveyor 10.

For instance, when the platform assembly 128 is in the first vertical position and the operator desires to move the platform assembly 128 up to a higher vertical position, the operator actuates the up actuator 470a on the control panel 450. The up actuator actuates the motor 220 to rotate the drive shaft 236 in the first direction, which correspondingly rotates the first and second drive rods 228, 232 in a first direction. As the first and second drive rods 228, 232 rotate, the respective threaded bushings 340 engage the respective drive rod 228, 232 to move the platform assembly 128 from the first vertical position to the higher vertical position.

When the platform assembly 128 is in a second or third vertical position and the operator desires to move the platform assembly 128 down to a lower vertical position, the operator actuates the down actuator 470b on the control panel 450. The down actuator 470 actuates the motor 220 to rotate the drive shaft 236 in the second direction, which correspondingly rotates the first and second drive rods 228, 232 in a second direction. As the first and second drive rods 228, 232 rotate, the respective threaded bushings 340 engage the respective drive rod 228, 232 to move the platform assembly 128 from the second or third position vertical to the lower vertical position. Because of the variable frequency drive 408, the operator can adjust the speed of the motor 220 to thereby adjust the speed at which the platform assembly 128 is movable relative to the conveyor 10.

Additionally, when the operator has positioned the platform 104 at the desired height, the operator may actuate, the operator may actuate the conveyor belt 30 using the control panel 450 (operation 712). For example, the operator may actuate the start belt and stop belt actuators 470g, 470h to start and stop the conveyor belt 30, as necessary, to load and unload product from the cargo container.

After use the operator platform unit 100 can be decoupled from the conveyor 10 and recoupled to another conveyor 10 (operation 716).

In some embodiments, the operator platform unit 100 may be physically coupled to the conveyor but not electrically coupled to the conveyor 10. In such case, the operator platform unit 100 is removably coupled to the conveyor 10 and is still operable to change the vertical height of the platform 104, as discussed above with respect FIG. 16.

FIGS. 17-23 illustrate an operator platform unit 100' according to another embodiment. The operator platform unit 100' of FIGS. 17-23 is similar to the operator platform unit 100 shown in FIGS. 1-15. Therefore, like structures will be identified with like reference numerals with a prime (').

The operator platform unit 100', like the operator platform unit 100 discussed above, includes a mounting assembly 120', a drive system assembly 124' coupled to the mounting assembly 120', and a platform assembly 128' movably coupled to the drive system assembly 124'. The mounting assembly 120' connects the operator platform unit 100 to the telescopic conveyor 10. The drive system assembly 124' couples the platform assembly 128' to the mounting assembly 120'. The platform assembly 128' is movably coupled to the drive system assembly 124' such that the platform 104' may be positioned a variety of heights relative to the support surface. The platform assembly 128' is configured move relative to the drive system assembly 124' and, accordingly, relative to the conveyor 10'. The operator platform unit 100' may be electrically and physically connected to the telescopic conveyor 10. The operator platform unit 100' is configured to move with the telescopic conveyor 10 as the telescopic conveyor 10 actuates. An operator can operate the conveyor 10 and the operator platform unit 100' from control panels 450' of the operator platform unit 100'. The control enclosure 400' is supported by the mounting assembly 120', rather than the platform assembly frame as in embodiment of FIGS. 1-15. As shown, the control enclosure 400' may be supported by the second bracket 162'. In some instances, the control enclosure 400' may be supported by platform assembly frame, which includes a base member 300' and a plurality of support members 304', 308', 312', 316', 320', 324' coupled to and extending from the base member 300'.

The platform assembly 128' of the operator platform unit 100' includes a first gravity roller section 412' and a second gravity roller section 416', each including a plurality of gravity rollers 414' that may be used to transfer products to and from the conveyor belt 30. As shown, a first extension 416a' is coupled to the first support member 304' and the second extension 416b' is coupled to the second support member 308'. As shown, the extensions 416a', 416b' are also part of the first gravity roller section 412'. That is, the first gravity roller section 412' includes gravity rollers 414' that are coupled between the first extension 416a' and the second extension 416b'.

The extensions 416a', 416b' are configured to pivotably couple to a second gravity roller section 420' that extends from the platform assembly 128' to the conveyor belt 30. As shown, the second gravity roller section 420' extends from the first gravity roller section 412'. The gravity roller section 420' defines a plane P1 that is positioned at an angle A1 relative to a vertical plane P2 of the platform assembly 128'. As discussed above, the second gravity roller section 420' is movable relative to the first and second support members 304', 308', such that the angle A1 adjusts as the platform assembly is moved vertically.

The operator platform 100' includes a conveyor portion 800 that is supported by the platform assembly 128'. Specifically, the conveyor portion 800 is supported by the first and second support members 304', 308' via the extensions 416a', 416b'.

The conveyor portion 800 includes a base 820 and a transfer mechanism 830 supported by the base 820. The base 820 also includes a handle 824 on each side thereof. The transfer mechanism 830 is a conveyor belt that is operable via the drive system 840 to move along a plane P3, which may be called a transfer plane.

When the transfer mechanism 830 is a conveyor belt, it is operable at various speeds via a drive system 840. The drive system 840 is supported by the base 820 and includes a motor 844 that moves the conveyor belt along a length of the conveyor portion 800. The drive system 840 is operably coupled to controller 404. Additionally, although not illustrated, the control panels 450 may include a conveyor portion actuator, such that the operator can stop and start the conveyor belt from the control panel 450. Although a conveyor belt is illustrated herein, in other or alternative embodiments, the transfer mechanism 830 may be powered rollers supported by the base 820, rather than the conveyor belt.

The conveyor portion 800 is pivotable relative to the platform assembly 128' via a pivot assembly 810 such that the operators are able to position the conveyor portion 800 relative to a support surface of a cargo container to or from which packages are to be loaded. Accordingly, the conveyor portion 800 is pivotable to a position that makes moving boxes, totes, parcels, etc. between the cargo container and the telescopic conveyor belt 30 easier and more ergonomic.

Figure 20:
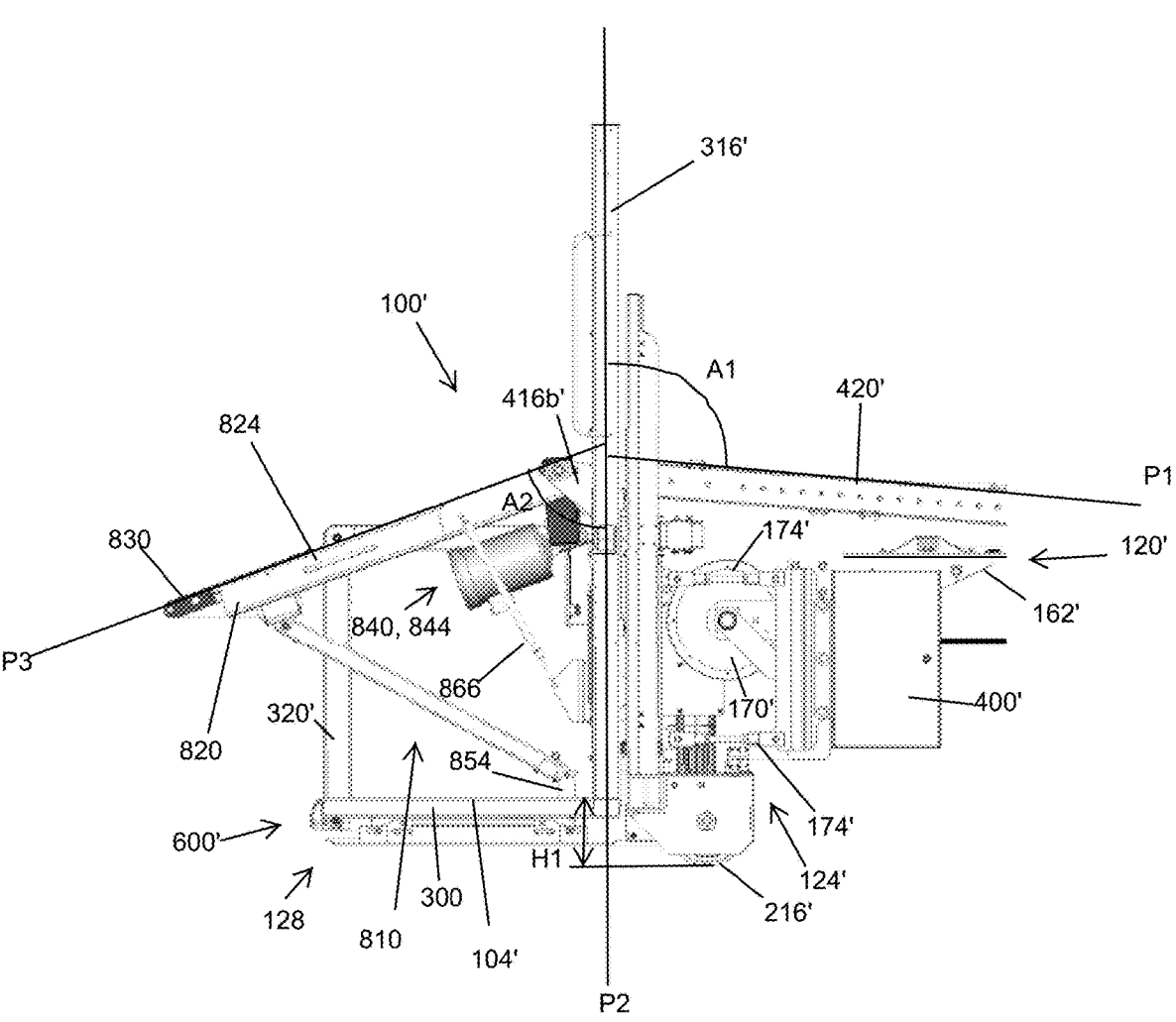
FIG. 20 illustrates a side view of the operator platform unit shown in FIG. 17 with a support member of the platform unit removed, a platform at a first height relative to a support surface and the conveyor, a conveyor portion, and a pivot assembly.
Figure 21:
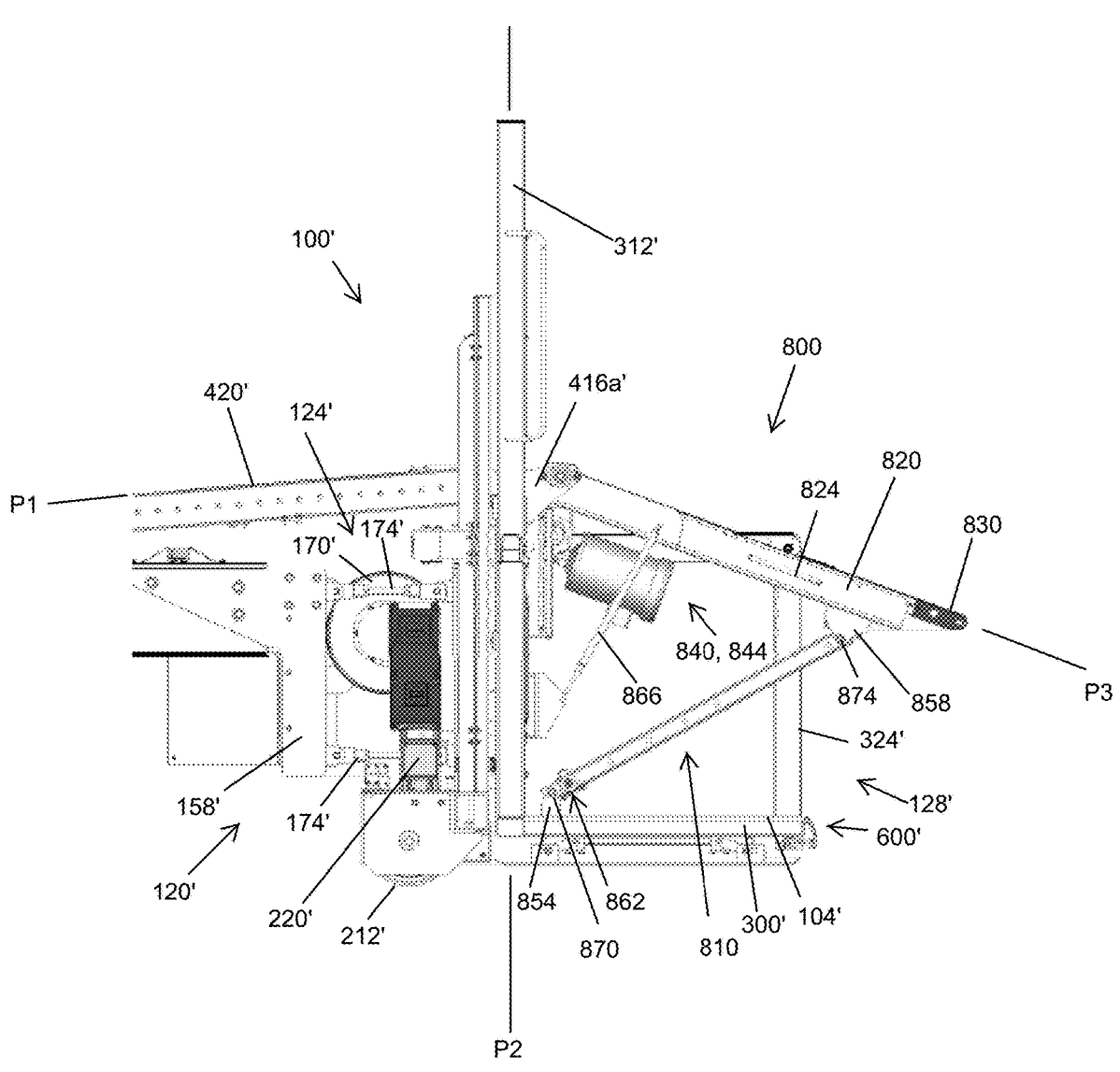
FIG. 21 illustrates another side view of the operator platform unit shown in FIG. 17 with a support member of the platform unit removed, the platform at a first height relative to a support surface and the conveyor, the conveyor portion, and the pivot assembly.
Figure 22:
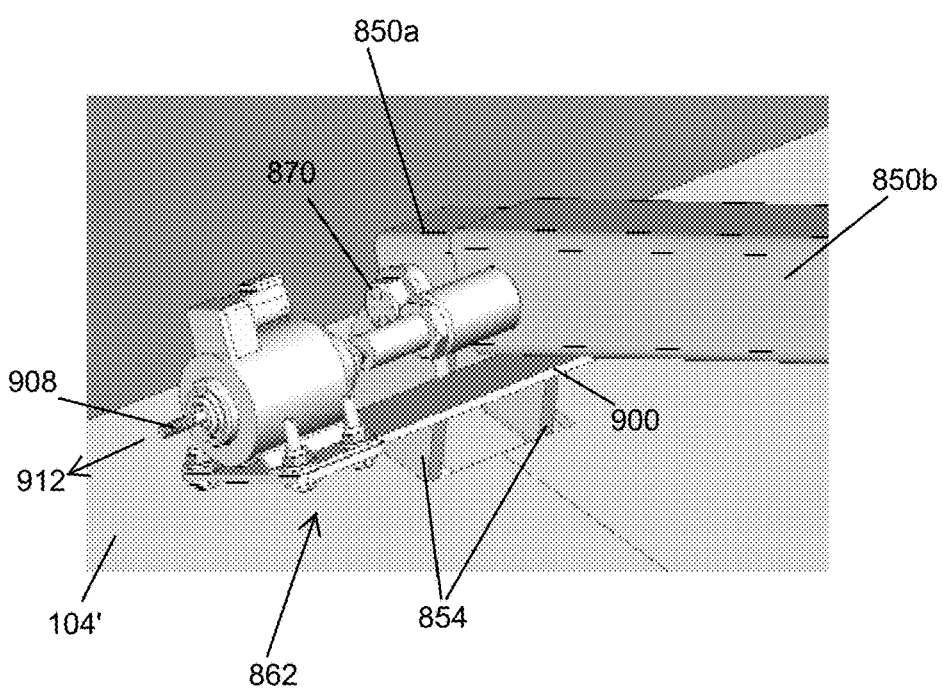
FIG. 22 illustrates a detailed perspective view of a portion of the pivot assembly of FIG. 20.

As shown in FIGS. 20-21, the pivot assembly 810 is a manual pivot assembly. As shown, the pivot assembly 810 includes a telescopic support member 850a, 850b that allows the conveyor portion 800 to pivot relative to the support members 304', 308' (and therefore the vertical plane P2) among a plurality of angles A2. The angle A2 may range from 70 degrees to 160 degrees, as will be discussed in greater detail below. In particular, the pivot assembly 810 includes a first bracket 854, a second bracket 858, a first support member 850a, a second support member 850b, and a lock mechanism 862. A first dampener 866 extends from the first support 304' to the base 820 and a second dampener 866 extends from the second support 308' to the base 820. The dampeners 866 provide additional support for the conveyor portion 800. The first bracket 854 is coupled to the platform 104' and the second bracket 858 is coupled to the base 820. The second bracket 858 is coupled to the base 820 adjacent a distal end of the base 820.

As shown in FIG. 21, the first support member 850a is pivotably coupled to the first bracket 854 via a pin 870 or other fastener. The first support member 850a includes a first end pivotably coupled to the first bracket 854 and a second end opposite the first end.

Figure 23:
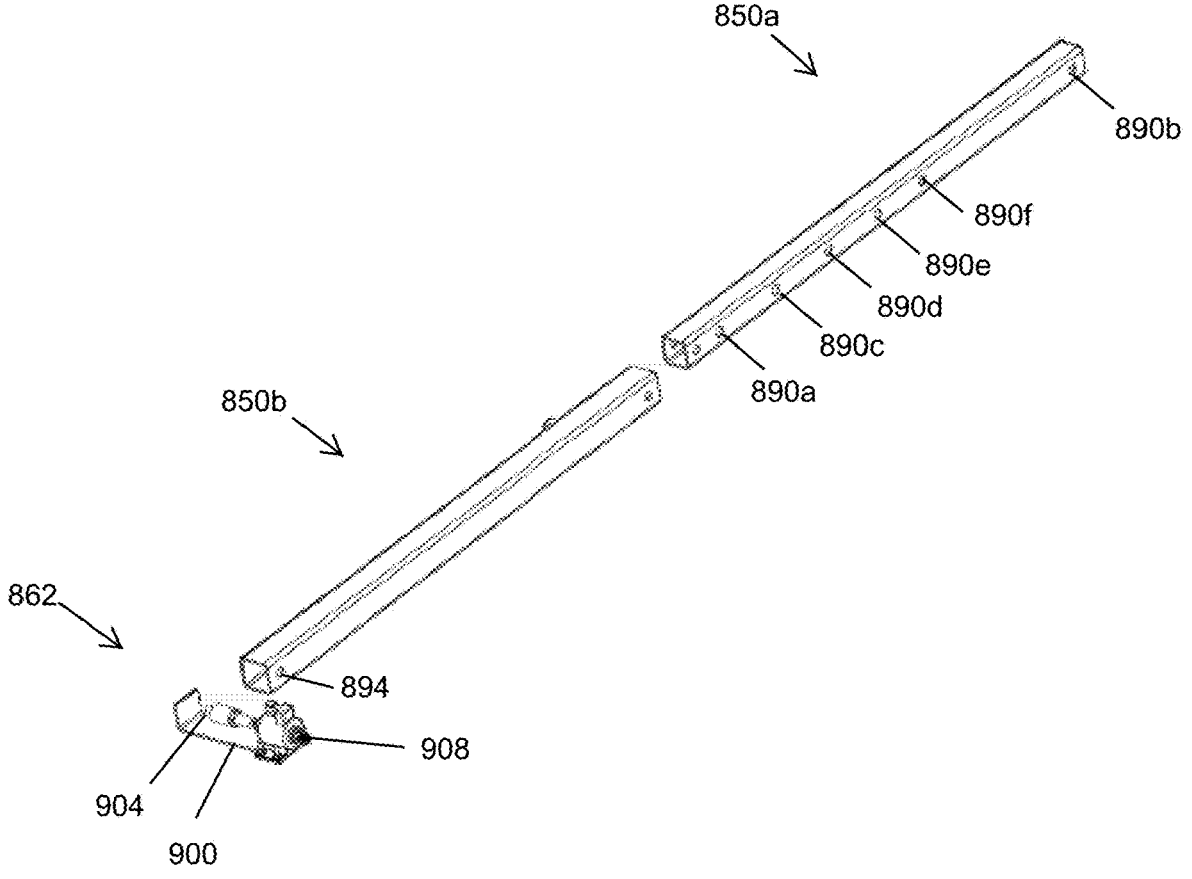
FIG. 23 illustrates an exploded view of a portion of the pivot assembly of FIG. 20.

With respect to FIG. 23, the first support member 850a includes a plurality of apertures 890a, 890b, 890c, 890d, 890e, 890f extending through a wall thereof. The apertures 890a, 890b, 890c, 890d, 890e, 890f are aligned along at least a portion of the length of the first support member 850a. The apertures 890a, 890b, 890c, 890d, 890e, 890f are configured to selectively receive a latch 904 of the locking mechanism 862, as will be discussed in greater detail below.

Further with respect to FIGS. 21 and 23, the second support member 850b is pivotably coupled to the second bracket 858 via a pin 874 or other fastener. The second support member 850b includes a first end and a second end opposite the first end. The second end is pivotably coupled to the second bracket 858. The second support member 850b includes an aperture 894 extending through a wall thereof. The aperture 894 is positioned at or adjacent to the first end thereof. The lock mechanism 862 is supported by the second support member 850b at or adjacent to the first end.

The first support member 850a and the second support member 850b define the telescopic support member. That is, the first support member 850a is positioned and slidable within the second support member 850b. The second support member 850b is movable along the length of the first support member 850a to align the aperture 894 of the second support member 850b with one of the apertures 890a, 890b, 890c, 890d, 890e, 890f in the first support member 850a. The lock mechanism 862 includes a support bracket 900 coupled to the second support member 850b and a spring-biased latch 904 that is supported by the support bracket 904. The latch 904 is selectively positioned within the aligned apertures of the first and second support members 850a, 850b. The latch 904 may be movable between a locked position and an unlocked position via an actuator 908. The latch 904 is biased by a biasing mechanism into the locked positioned. The biasing mechanism may be, for example, a spring. A force exerted on the actuator in the direction of arrow 912 (FIG. 22) moves the latch 904 against the biasing mechanism to move the latch 904 from the locked position to the unlocked position. Once the force 912 is removed, the latch 904 is biased back to the locked position and seated within the aligned apertures 894, 890a, 890b, 890c, 890d, 890c, 890f in the first and second support members 850a, 850b.

The operator can pivot the conveyor portion 800 to position the conveyor portion 800 relative to the support members 304', 308' and, in this case, the gravity roller sections 412', 420' using the pivot assembly 810. In particular, with the latch 904 in the unlocked position, the operator can move the conveyor portion 800 via one or both handles 824 from a first angular position (FIGS. 20 and 21) to a second angular position.

In the first angular position, a first aperture 890a of the first support member 850a is aligned with the aperture 854 in the second support member 850b and the latch 904 is received in the aligned apertures 854, 890a. The first aperture 890a is adjacent the first end of the first support member 850a. Accordingly, the plane P3 of the conveyor portion 800 is positioned at a first angle A2 relative to the first vertical plane P2.

In the second angular position, a second aperture 890b of the first support member 850a is aligned with the aperture 854 in the second support member 850b and the latch 904 is received in the aligned apertures 854, 890b. The second aperture 890b is between the first aperture 850b and the second end of the first support member 850a. Accordingly, the plane P3 of the conveyor portion 800 is positioned at a second angle A2 relative to the first vertical plane P2. The second angle A2 is greater than the first angle A2. For example, the first angle A2 may be 70 degrees, whereas the second angle A2 may be greater than 70 degrees for example, the second angle A2 may be 160 degrees.

The operator can move or pivot the conveyor portion 800 from the first angular position or the second angular position to one or more intermediate angular positions between the first angular position and the second angular position. For example, in a first intermediate angular position between the first angular position and the second angular position, a third aperture 890c, 890d, 890e, 890f of the first support member 850a is aligned with the aperture 854 in the second support member 850b and the latch 904 is received in the aligned apertures 854, 890c, 890d, 890c, 890f. The third aperture 890c, 890d, 890e, 890f is between the first aperture 890a and the second aperture 890b. Accordingly, the plane P3 of the conveyor portion 800 is positioned at a third angle A2 relative to the first vertical plane P2. The third angle A2 is greater than the first angle A2 but less than the second angle A2. For example, the third angle A2 may range from 80 degrees to 110 degrees.

In one specific example, there may be three intermediate angular positions in addition to the first intermediate angular position. In other words, the operator can move or pivot the conveyor portion 800 from the first angular position, the second angular position, or the first intermediate angular position to a second intermediate angular position, a third intermediate angular position, and a fourth intermediate angular position.

Accordingly, in the first intermediate angular position between the first angular position and the second angular position, the third aperture 890*c* of the first support member 850*a* is aligned with the aperture 854 in the second support member 850*b* and the latch 904 is received in the aligned apertures 854, 890*c*. The third aperture 890*c* is between the first aperture 890*a* and the second aperture 890*b*. Accordingly, the plane P3 of the conveyor portion 800 is positioned at a third angle A2 relative to the first vertical plane P2. The third angle A2 is greater than the first angle A2 but less than the second angle A2. For example, the third angle A2 may be 80 degrees.

In the second intermediate angular position between the first angular position and the second angular position, the fourth aperture 890*d* of the first support member 850*a* is aligned with the aperture 854 in the second support member 850*b* and the latch 904 is received in the aligned apertures 854, 890*d*. The fourth aperture 890*d* is between the first aperture 890*a* and the second aperture 890*b*, and specifically, between the third aperture 890*c* and the second aperture 890*b*. Accordingly, the plane P3 of the conveyor portion 800 is positioned at a fourth angle A2 relative to the first vertical plane P2. The fourth angle A2 is greater than the first and third angles A2 but less than the second angle A2. For example, the fourth angle A2 may be 90 degrees.

In the third angular intermediate position between the first angular position and the second angular position, the fifth aperture 890*e* of the first support member 850*a* is aligned with the aperture 854 in the second support member 850*b* and the latch 904 is received in the aligned apertures 854, 890*e*. The fifth aperture 890*e* is between the first aperture 890*a* and the second aperture 890*b*, and specifically, between the fourth aperture 890*c* and the second aperture 890*b*. Accordingly, the plane P3 of the conveyor portion 800 is positioned at a fifth angle A2 relative to the first vertical plane P2. The fifth angle A2 is greater than the first, third, and fourth angles A2 but less than the second angle A2. For example, the fifth angle A2 may be 100 degrees.

In the fourth angular intermediate position between the first angular position and the second angular position, the sixth aperture 890*f* of the first support member 850*a* is aligned with the aperture 854 in the second support member 850*b* and the latch 904 is received in the aligned apertures 854, 890*f*. The sixth aperture 890*f* is between the first aperture 890*a* and the second aperture 890*b*, and specifically, between the fifth aperture 890*c* and the second aperture 890*b*. Accordingly, the plane P3 of the conveyor portion 800 is positioned at a sixth angle A2 relative to the first vertical plane P2. The sixth angle A2 is greater than the first, third, fourth, and fifth angles A2 but less than the second angle A2. For example, the sixth angle A2 may be 110 degrees.

In other embodiments, the angle A2 may range from 70 degrees to 160 degrees in any suitable increments.

The dampeners 366 are configured to provide additional support to the conveyor portion 800 in each angular position.

In other embodiments, the conveyor portion 800 may include an electronic pivot assembly 810 including an electric motor and one or more linear actuators. The electric motor may be operably coupled to the controller 404 and the linear actuator(s). The linear actuator(s) may extend between the base 820 and the platform 104' in lieu of the telescopic support member 850*a*, 850*b*. That is, the linear actuator may be pivotably coupled to the base 820 of the conveyor portion 800 and pivotably coupled to the platform 104'. The electric motor may be actuated, via actuators (e.g., buttons) on the control panels 450, to extend and retract the linear actuator to pivot the conveyor portion 800 relative to the support members 304', 308' (and in this case the gravity roller sections 412', 420').

The invention claimed is:

1. An operator platform unit couplable to a conveyor, the operator platform unit comprising:
   a mounting assembly configured to couple to the conveyor;
   a drive system assembly coupled to the mounting assembly, the drive system assembly comprising:
   a drive assembly, and
   a drive rod configured to be driven by the drive assembly, and
   a platform assembly movably coupled to the drive system assembly, the platform assembly comprising:
   a platform configured to support the operator, and
   a controller in communication with the drive assembly, the controller configured to actuate the drive assembly and move the platform relative to the drive system assembly and the conveyor,
   wherein a plurality of linkages is movably coupled between the mounting assembly and the drive system assembly to allow the mounting assembly to move relative to the drive system assembly.

2. The operator platform unit according to claim 1, the controller is configured to actuate the drive assembly and move the platform assembly vertically relative to the drive system assembly and the conveyor.

3. The operator platform unit according to claim 1, wherein the drive system assembly comprises a motor and a transmission driven by the motor.

4. The operator platform unit according to claim 3, wherein the platform assembly further comprises a sensor in communication with the controller and configured to stop the motor when the platform assembly is at a predetermined maximum height.

5. The operator platform unit according to claim 3, wherein the platform assembly further comprises a sensor in communication with the controller and configured to stop the motor when the platform assembly is at a predetermined minimum height.

6. The operator platform unit according to claim 1, further comprising a conveyor portion that is pivotably coupled to the platform assembly, the conveyor portion including:
   a base pivotably coupled to the platform assembly,
   a transfer mechanism movably coupled to the base, and
   a transfer plane,
   wherein the transfer mechanism is configured to move items along the base to the conveyor, and
   wherein the conveyor portion is movable between a first position in which the transfer plane is positioned at a first angle relative to a vertical plane of the platform assembly and a second position in which the transfer plane is positioned at a second angle relative to the vertical plane, the second angle being greater than the first angle.

7. An operator platform unit couplable to a telescopic conveyor, the operator platform unit comprising:
   a mounting assembly configured to couple to the telescopic conveyor;
   a drive system assembly coupled to the mounting assembly, the drive system assembly comprising:

a drive assembly, and
a drive rod configured to be driven by the drive assembly, and
a platform assembly movably coupled to the drive system assembly, the platform assembly comprising:
a platform configured to support an operator, and
a controller in communication with the drive assembly, the controller configured to:
operate the telescopic conveyor, and
actuate the drive assembly and move the platform assembly relative to the drive system assembly and the telescopic conveyor,
wherein the drive system assembly comprises a motor and a transmission driven by the motor.

8. The operator platform unit according to claim 7, the controller is configured to actuate the drive assembly and move the platform assembly vertically relative to the drive system assembly and the telescopic conveyor.

9. The operator platform unit according to claim 7, wherein the platform assembly further comprises:
a sensor in communication with the controller and configured to stop the motor when the platform assembly is at a predetermined maximum height,
a sensor in communication with the controller and configured to stop the motor when the platform assembly is at a predetermined minimum height, and
a sensor in communication with the controller and configured to sense when the platform assembly engages or is about to engage an adjacent structure.

10. The operator platform unit according to claim 7, wherein the platform assembly further comprises:
an electrical connector that enables electrical communication between the controller and a controller of the telescopic conveyor, and
a control panel in communication with the controller of the platform assembly,
wherein the control panel comprises actuators that enable the operator to control the telescopic conveyor.

11. The operator platform unit according to claim 7, wherein the conveyor is a telescopic conveyor that is configured to move forward and rearward; and
wherein the operator platform unit is movable with the conveyor.

12. The operator platform unit according to claim 7, further comprising a conveyor portion that is pivotably coupled to the platform assembly, the conveyor portion including:

a base pivotably coupled to the platform assembly,
a transfer mechanism movably coupled to the base, and
a transfer plane,
wherein the transfer mechanism is configured to move items along the base to the telescopic conveyor, and
wherein the conveyor portion is movable between a first position in which the transfer plane is positioned at a first angle relative to a vertical plane of the platform assembly and a second position in which the transfer plane is positioned at a second angle relative to the vertical plane, the second angle being greater than the first angle.

13. A method of using an operator platform unit, the operator platform unit including a mounting assembly that is removably couplable to a conveyor, a drive system assembly that is coupled to the conveyor, and a platform assembly that is movable coupled to the drive system assembly, the drive system assembly including a drive assembly configured to be driven by a motor and a drive rod configured to be driven by the drive assembly, the platform assembly including a platform that supports an operator, the method comprising:
actuating, via a controller of the operator platform unit, the drive assembly to move the platform relative to the drive system assembly and the conveyor between a first position in which the platform is at a first height and a second position in which the platform is at a second, different height,
actuating, via the controller of the operator platform unit, a drive system of the conveyor to one of extend the conveyor, retract the conveyor, start a conveyor belt, and stop the conveyor belt, and
moving the operator platform unit with the conveyor when the conveyor extends and retracts,
wherein the operator platform unit has wheels, and wherein moving the operator platform unit with the conveyor comprises moving the operator platform unit on a support surface via the wheels.

14. The method according to claim 13, further comprising coupling the operator platform unit to the conveyor by coupling the mounting assembly to the conveyor, and wherein coupling the operator platform unit to the conveyor comprises electrically coupling the controller of the operator platform unit to a controller of the conveyor.

15. The method according to claim 14, further comprising removing the operator platform unit from the conveyor by decoupling the mounting assembly from the conveyor.

* * * * *